(12) United States Patent  (10) Patent No.: US 7,578,544 B1
Shimamura et al.  (45) Date of Patent: Aug. 25, 2009

(54) PICKUP-STYLE WORK VEHICLE

(75) Inventors: Teruo Shimamura, Nishinomiya (JP); Norimi Nakamura, Sakai (JP); Yoshimi Hirooka, Sakai (JP); Taro Nakamura, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/203,351

(22) Filed: Sep. 3, 2008

(30) Foreign Application Priority Data

Jan. 31, 2008 (JP) ............................. 2008-021696

(51) Int. Cl.
*B62D 25/00* (2006.01)
(52) U.S. Cl. .............. 296/183.2; 296/26.11; 296/65.05; 298/17 R
(58) Field of Classification Search .............. 296/26.11, 296/26.08, 65.05, 65.09, 183.1, 186.4, 183.2, 296/190.11; 298/1 A, 17 R
See application file for complete search history.

(56) References Cited

U.S. PATENT DOCUMENTS 6,923,507 B1 * 8/2005 Billberg et al. ............ 298/17 R
6,994,388 B2    2/2006 Saito et al.

* cited by examiner

*Primary Examiner*—Joseph D Pape
(74) *Attorney, Agent, or Firm*—The Webb Law Firm

(57) ABSTRACT

A pickup-style work vehicle comprises a front driver's seat, a backseat, a loading floor that is located rearwardly of the backseat and that can be moved to a dumping position, a loading floor size changeover mechanism, and a backseat posture change mechanism. The loading floor size changeover mechanism changes the size of the loading floor between a first state in which a front wall portion and a front bottom portion of the loading floor are moved forwardly in a fore-and-aft direction and a second state in which the front wall portion and the front bottom portion of the loading floor are moved rearwardly in a fore-and-aft direction. The backseat posture change mechanism changes a posture of the backseat between a first posture which is a non-use state and a second posture which is a use state. The fore-and-aft dimension of the backseat in the first posture is less than a fore-and-aft dimension of the backseat in the second posture. the backseat in the first posture is located immediately forwardly of the loading floor in the first state and the backseat in the second posture is located immediately forwardly of the loading floor in the second state.

4 Claims, 20 Drawing Sheets

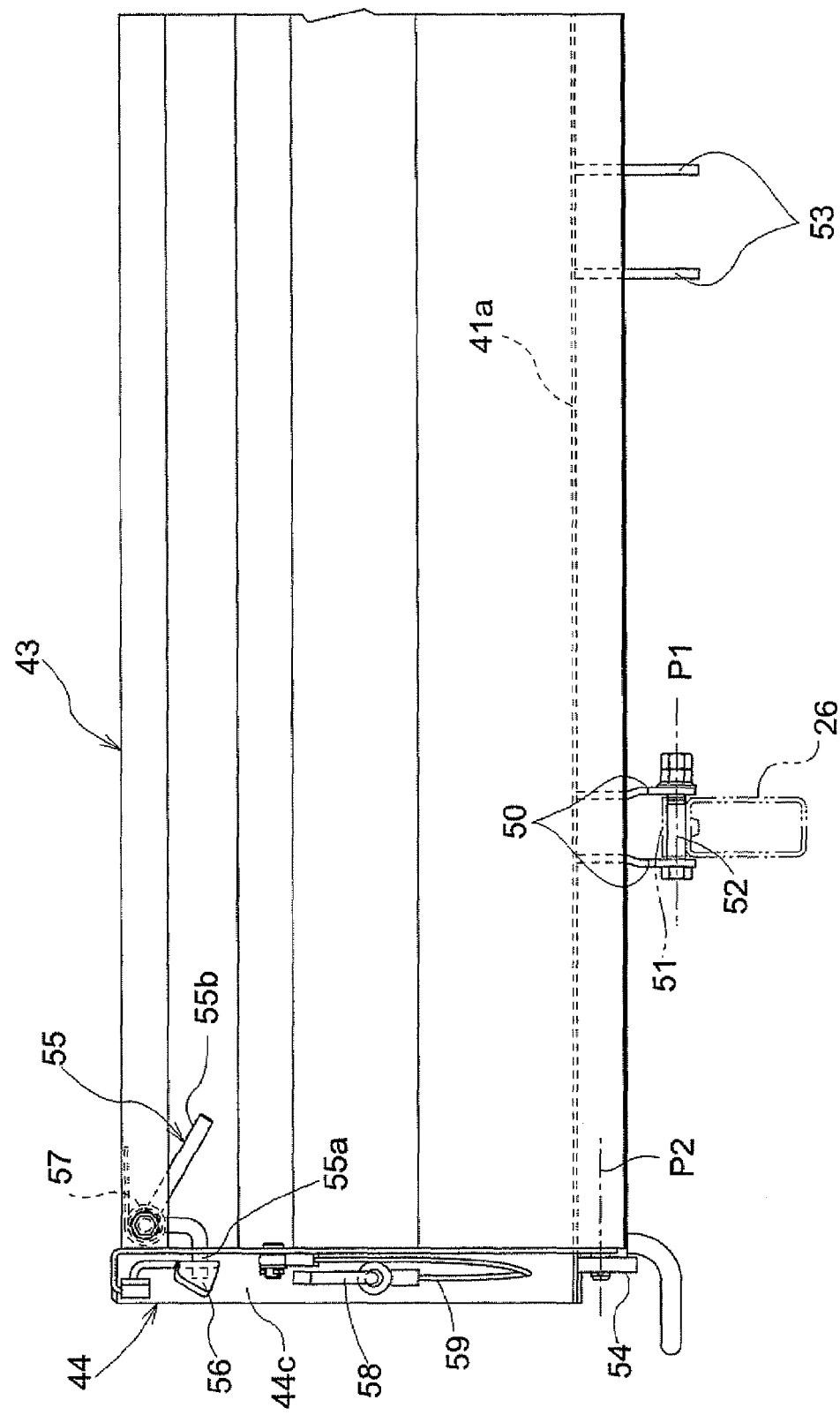

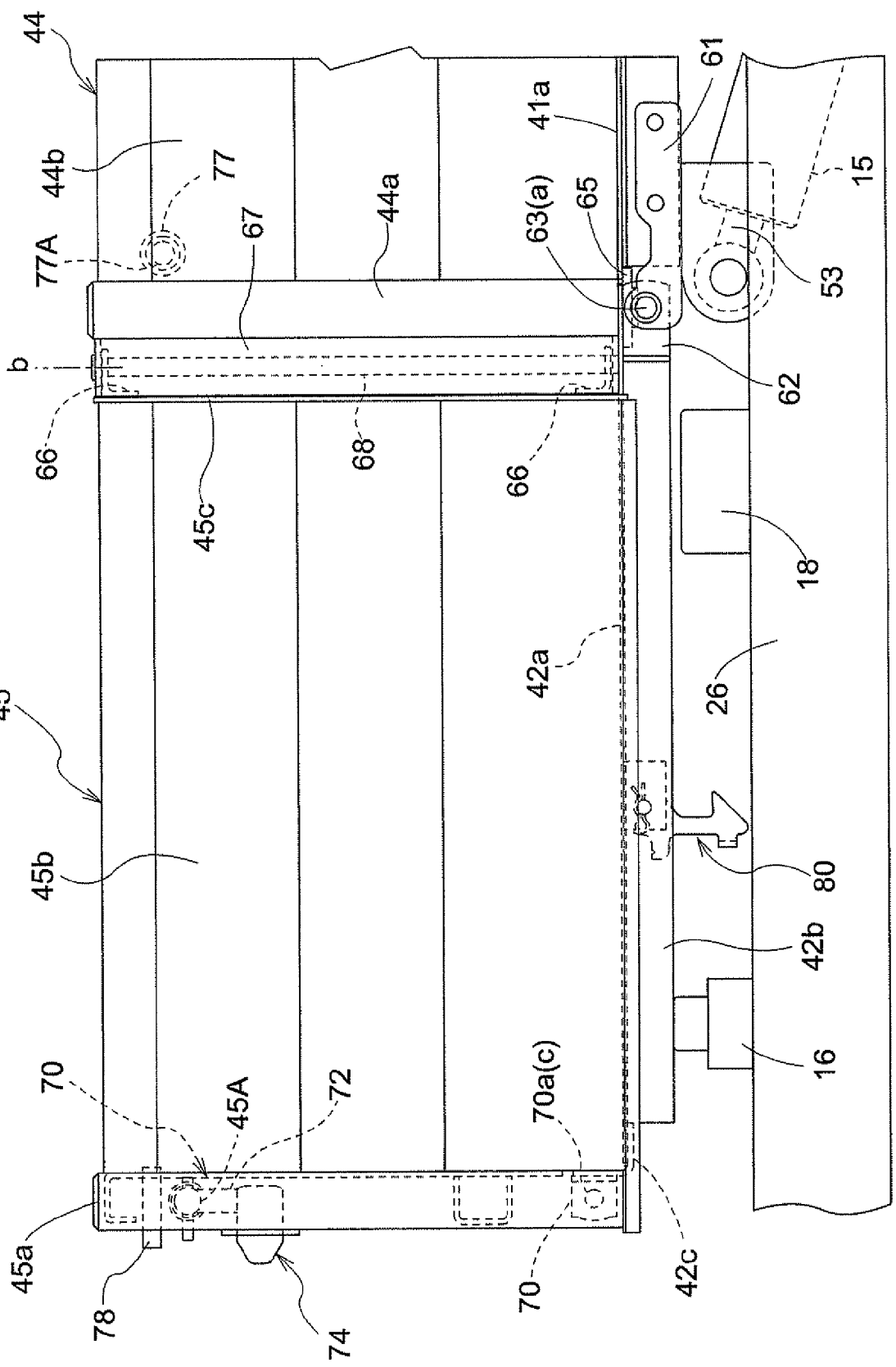

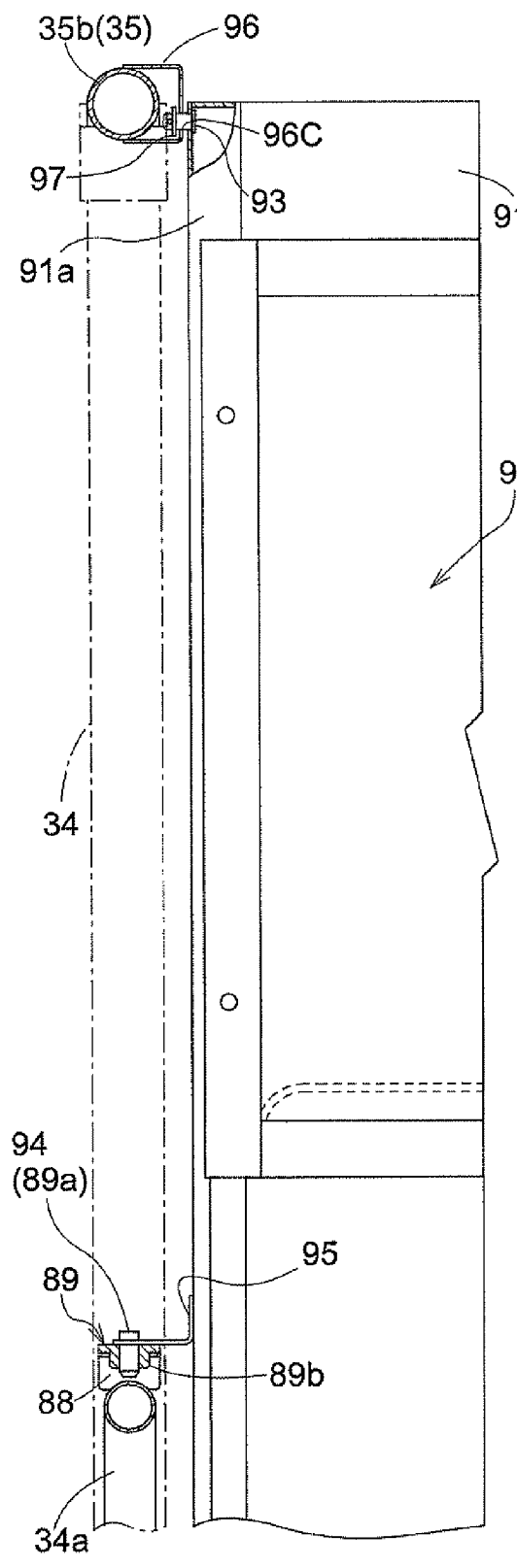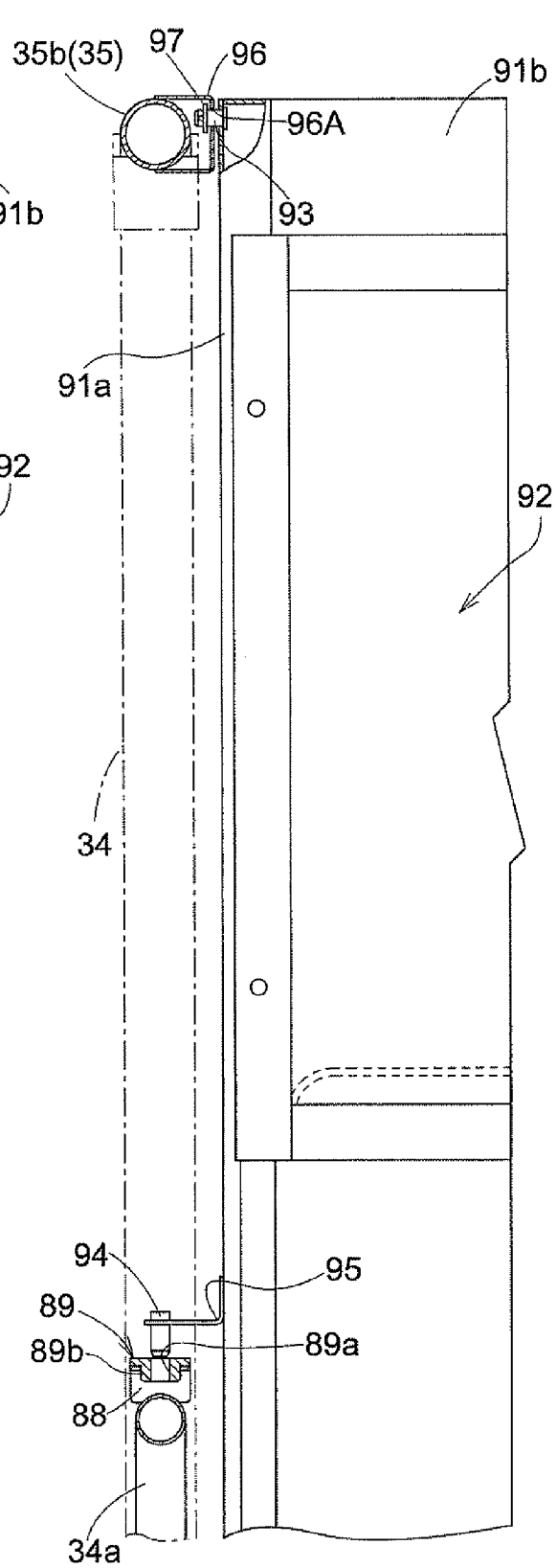

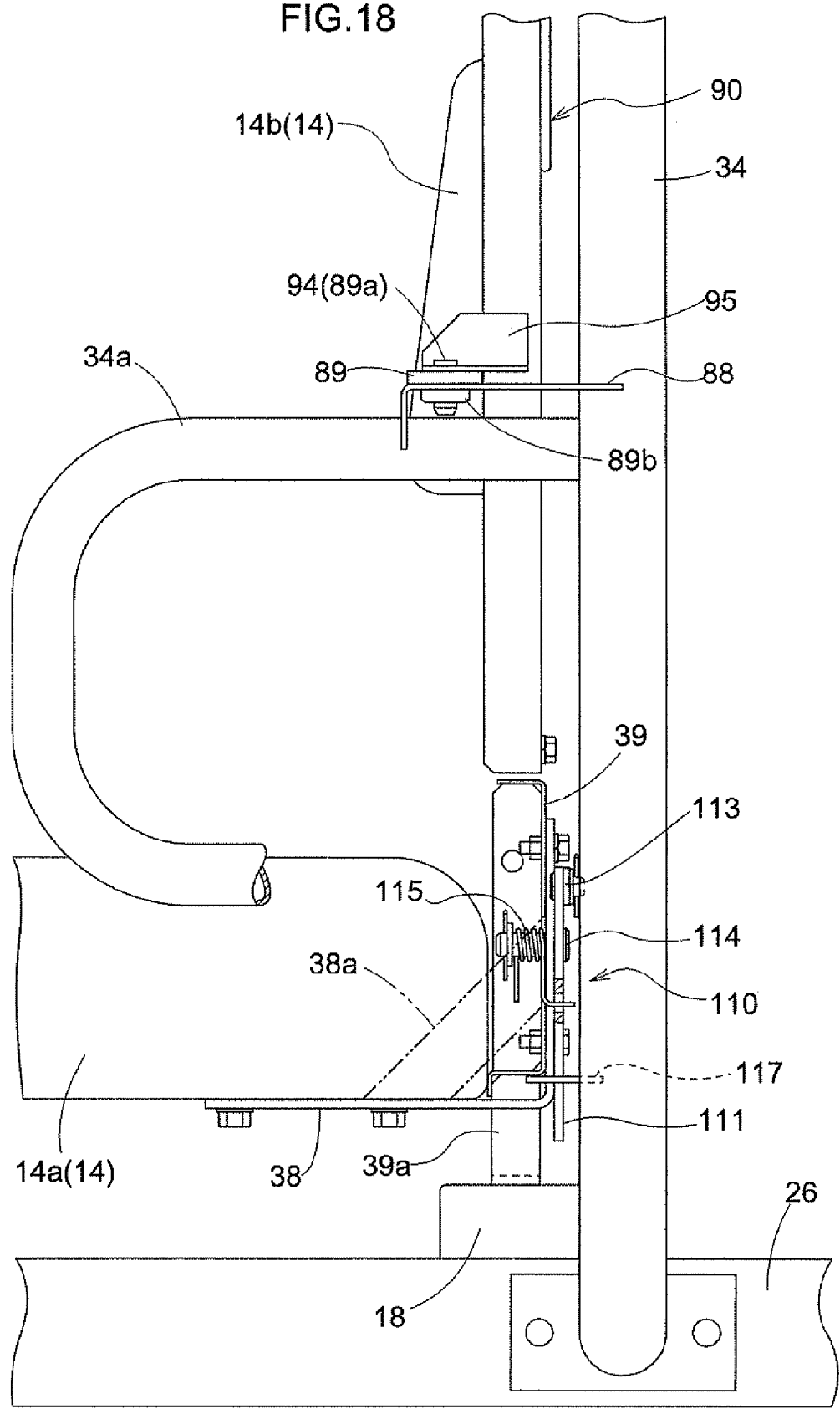

PICKUP-STYLE WORK VEHICLE

BACKGROUND OF THE INVENTION

1. Field of the Invention

The present invention relates to a pickup-style work vehicle having a front driver's seat, a backseat, and a loading floor that is arranged rearwardly of the backseat and that can be moved to a dumping position.

2. Description of the Related Art

A conventional pickup-style work vehicle is known from U.S. Pat. No. 6,994,388 (see FIG. 2, FIGS. 4-7), which has a front driver's seat (shown at 3 in FIG. 2), a backseat (shown at 4 in FIG. 2) and a loading floor (shown at 2 in FIG. 2) that is arranged rearwardly of the backseat and that can be moved a dumping position. In this work vehicle, a space for the backseat, when pivoted rearwardly, is created by moving the attachment position of a divider (shown at 5 in FIG. 2 of the patent) rearwardly, and by moving the front side wall rearwardly (shown at 21 of FIGS. 6 and 7). This allows the backseat to be pivoted rearwardly to its use state (a configuration in which passengers can sit on the backseat).

In the known work vehicle mentioned above, the use state in which the backseat is pivoted rearwardly (a configuration in which passengers can sit on the backseat) is achieved by laying the backseat on the bottom of the loading floor (shown at 20 in FIGS. 6 and 7) without moving the front part of the bottom of the floor rearwardly. Therefore, since the loading floor interferes with the backseat, it was not possible for the loading floor to be moved to its dumping position when the backseat is in the use state in which the backseat is pivoted rearwardly (a configuration in which passengers can sit on the backseat). (See FIGS. 4 and 5.)

As a result, with this work vehicle, the loading floor needs to be moved to its dumping position after checking the state or the configuration of the backseat or after the backseat is raised forwardly to its non-use state. Therefore, there exists a problem where it is difficult to perform the dumping operation of the loading floor simply and quickly, reducing efficiency of the dumping operation of the loading floor. Further, there exits an additional problem that the backseat may be damaged if the loading floor is moved to its dumping position accidentally when the backseat is in the use state.

SUMMARY OF THE INVENTION

An object of the present invention is to provide a pickup-style work vehicle that has a loading floor that can be moved to a dumping position without having to move the backseat from its use position, thus improving efficiency of a dumping operation.

To achieve the object described above, a pickup-style work vehicle in accordance with the present invention comprises: a front driver's seat, a backseat, a loading floor located rearwardly of the backseat, the loading floor capable of being moved to a dumping position, a loading floor size changeover mechanism that changes a size of the loading floor between a first state in which a front wall portion and a front bottom portion of the loading floor are moved forwardly in a fore-and-aft direction of a vehicle and a second state in which the front wall portion and the front bottom portion of the loading floor are moved rearwardly in the fore-and-aft direction, a backseat posture change mechanism that changes a posture of the backseat between a first posture which is a non-use state and a second posture which is a use state, a fore-and-aft dimension of the backseat in the first posture being less than the fore-and-aft dimension of the backseat in the second posture. The backseat in the first posture is located immediately forwardly of the loading floor in the first state and the backseat in the second posture is located immediately forwardly of the loading floor in the second state.

With this configuration, the front wall portion and the front bottom portion of the loading floor are moved rearwardly when the loading floor is changed from the first state to the second state. With the loading floor in the second state, the posture of the backseat is changed to the second posture and the backseat in its use state then can be positioned in a space created by rearwardly moving the front wall portion and the front bottom portion of the loading floor. Since the front bottom portion of the loading floor is moved rearwardly when the loading floor is moved to the second state, the front bottom portion will not be located underneath the backseat in the second posture. Therefore, even when the front bottom portion is lifted during a dumping operation of the loading floor in the second state, the raising front bottom portion will not interfere with the backseat in the second posture, thus allowing for a dumping operation of the loading floor without having to move the backseat out of the use state which is the second state.

In the present pickup-style work vehicle, the loading floor can be moved to a dumping position without having to check the state of the backseat or to change the backseat from the second posture to the first posture. This makes a dumping operation simpler and quicker, thus improving efficiency of the dumping operation of the loading floor. In addition, since the loading floor during a dumping operation will not interfere with the backseat in the second posture, any damage to the backseat can be prevented.

Other features and advantages of the present invention will become apparent from the description provided below with reference to the drawings.

BRIEF DESCRIPTION OF THE DRAWINGS

FIG. 7 is a rear view of the loading floor;

FIG. 8 is a side view of the front part of the loading floor in the extended state;

FIG. 17A is a vertical sectional rear view showing the support structure of an upper portion of the partition member;

FIG. 17B is a vertical sectional rear view showing the support structure of an upper portion of the partition member;

FIG. 18 is a side view showing the structure of the rear lock mechanism of the rear seat bottom;

DESCRIPTION OF THE PREFERRED EMBODIMENTS

Overall Configuration of the Work Vehicle

Figure 1:
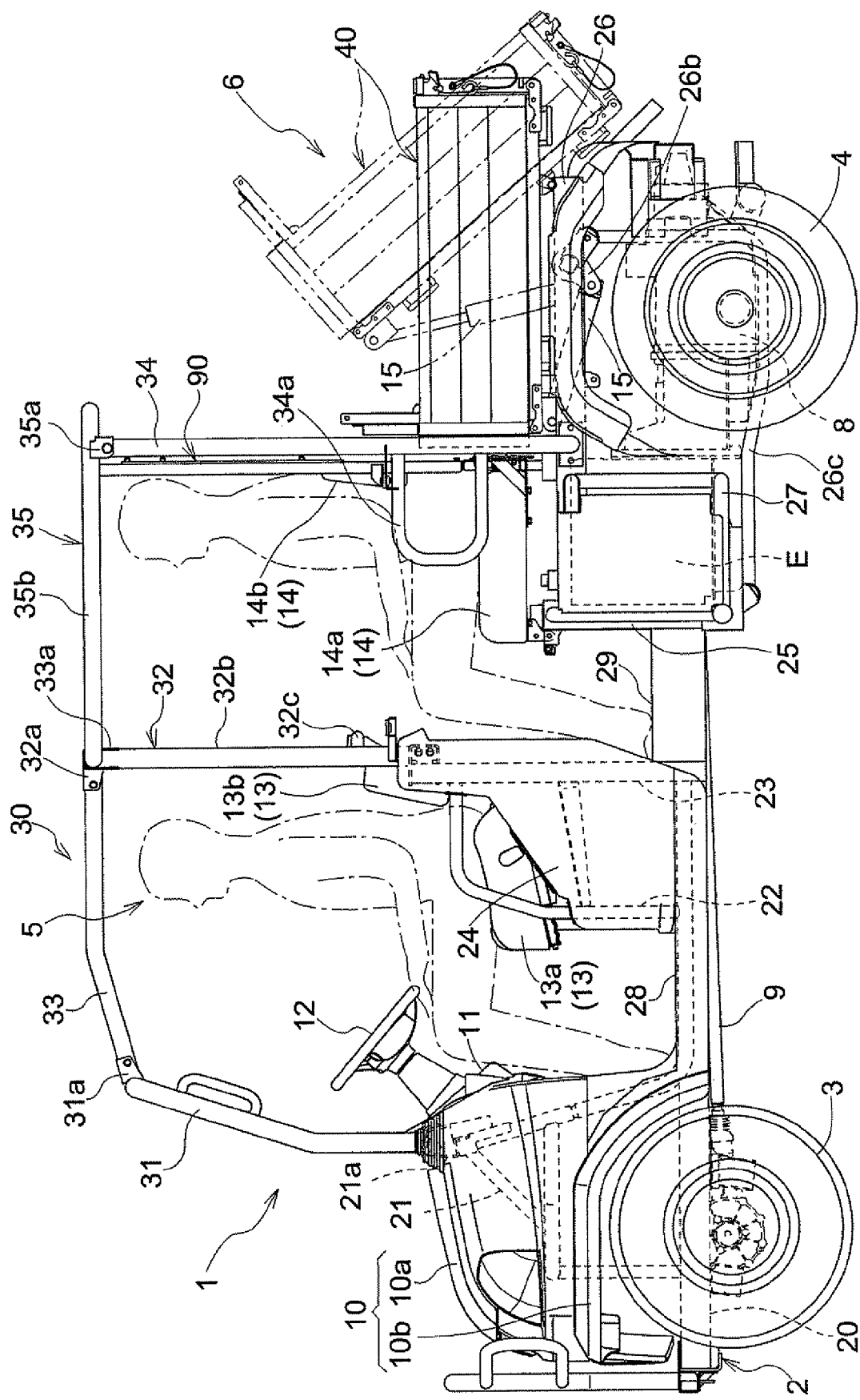
FIG. 1 is a side view of the entire pickup style work vehicle switched to the double-row seat mode.
Figure 2:
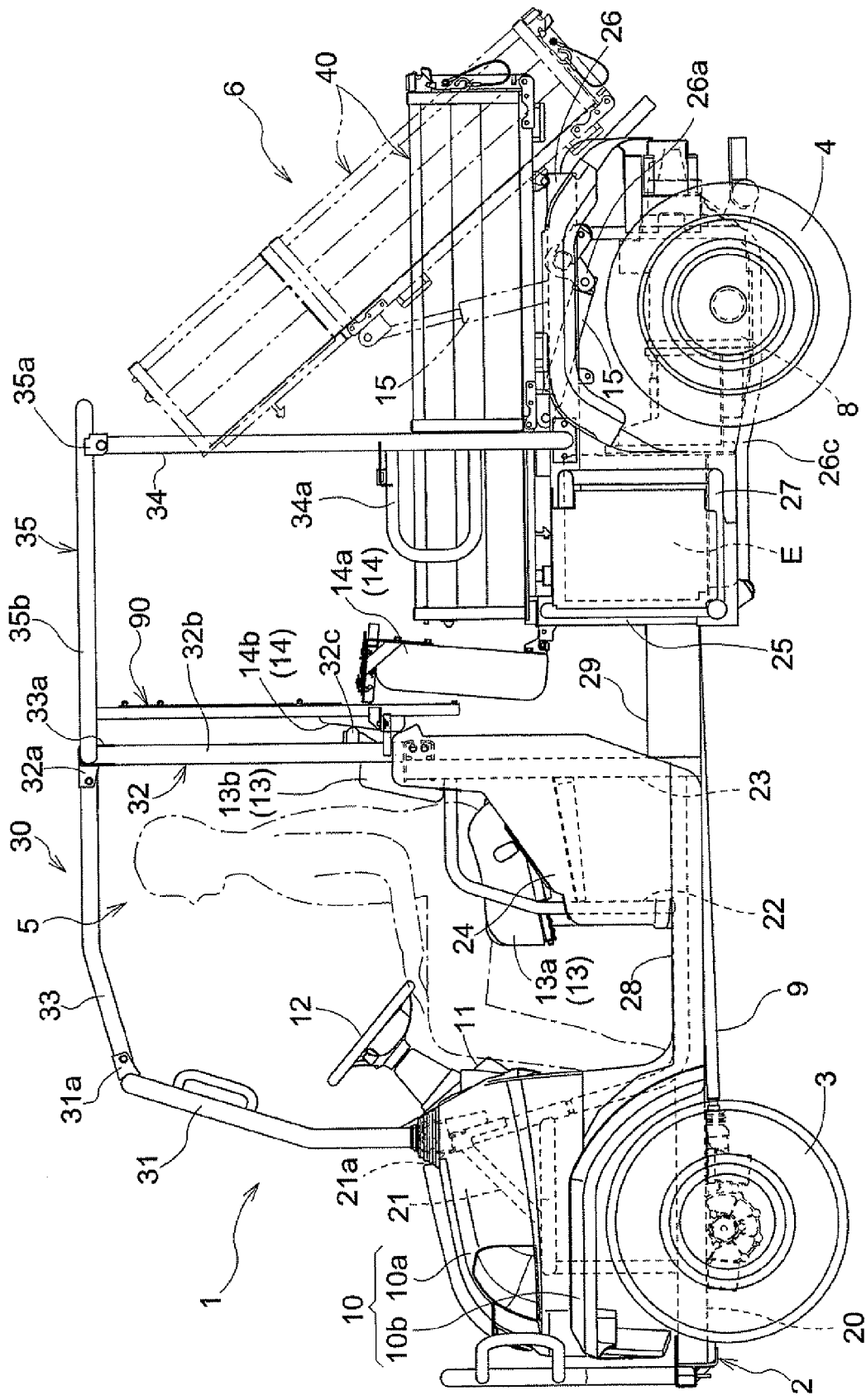
FIG. 2 is a side view of the entire pickup style work vehicle switched to the single-row seat mode.
Figure 3:
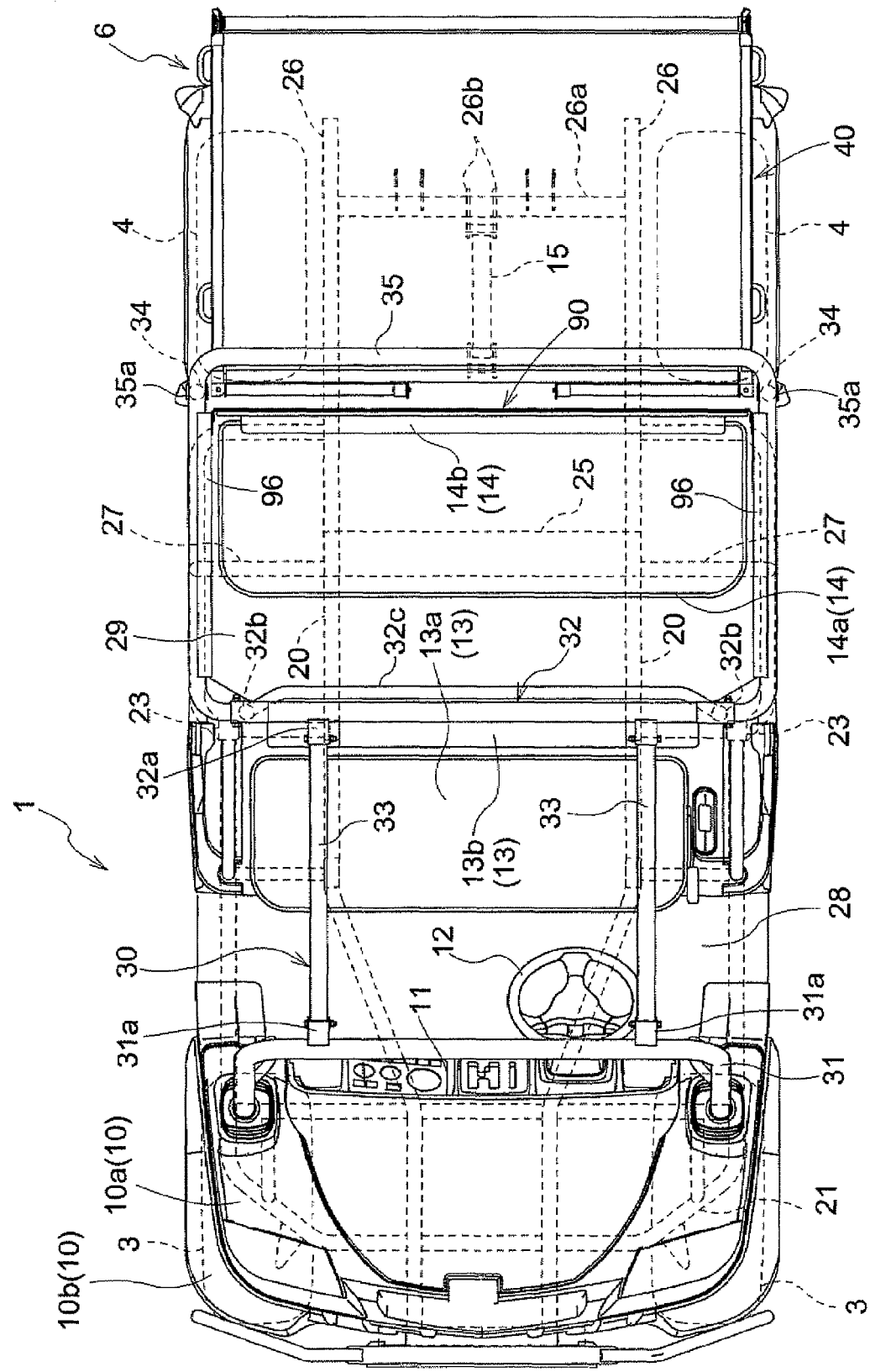
FIG. 3 is a plan view of the entire pickup style work vehicle switched to the double-row seat mode.

The overall configuration of the pickup style work vehicle in accordance with the first embodiment of the present invention is described next with reference to FIGS. 1-3. FIG. 1 is an overall side view of the work vehicle in the double-row seat mode, and FIG. 2 is an overall side view of the work vehicle in single-row seat mode. FIG. 3 is an overall plan view of the work vehicle in the double-row seat mode. As shown in FIGS. 1-3, the vehicle body 1 is provided with steerable right and left front wheels 3 supported by the front part of the vehicle body frame 2, and non-steerable right and left rear wheels 4 which are supported by the rear part of the vehicle body frame 2, and is a four-wheel drive vehicle.

The vehicle body 1 has, in its intermediate or midway area in the fore-and-aft direction (i.e. a forward and rearward direction), a driving section 5 whose mode can be changed between a double-row seat mode (a four-or-five-seater mode) shown in FIG. 1 in which passengers can sit in the front driver's seat 13 and the backseat 14, and a single-row mode (two-seater mode) shown in FIG. 2 in which passengers can sit in the front driver's seat 13. Behind the driving section 5 is a rear loading section 6 having a loading floor 40, which can be changed between an extended state and a shortened state described below, and which can be moved to a dumping position for dumping materials. Located between the driving section 5 and the rear loading section 6 is a partition member 90 that divides the driving section 5 and the rear loading section 6 (and that forms a back wall of the driving section 5).

The engine E, which functions as a source of driving force of the work vehicle, is located in a rear lower part of the vehicle body frame 2 and a transmission case 8 is connected to the rear of the engine E. The transmission case 8 has a hydrostatic continuously variable transmission HST (not shown), and the right and left rear wheels 4 are operatively connected to the right and left sides of the transmission case 8 respectively. Thus, the power from the engine E is transmitted to the hydrostatic continuously variable transmission through the transmission case 8. The right and left rear wheels 4 are rotated by the power that is continuously varied by the hydrostatic continuously variable transmission.

A front-wheel drive axis 9 extends forwardly from the transmission case 8, and the right and left front wheels 3 are operatively connected to the front-wheel drive axis 9 through a front-wheel differential gear device (not shown). Thus, the power from engine E is transmitted to the front-wheel differential device through the hydrostatic continuously variable transmission and the transmission case 8 to rotate the right and left front wheels 3.

The front part of the vehicle body 1 has a front cover 10, and this front cover 10 includes a top cover 10a which covers the front part of the vehicle body 1 from above, and a lower cover 10b which covers the front part of the vehicle body 1 from the front and the side. Attached to the rear of the front cover 10 is a console panel 11 which covers the front side of the driving section 5. A steering wheel 12 for steering the right and left front wheels 3 extends from the left-hand side part of this console panel 11.

The vehicle body frame 2 has right and left main frames 20 that are pipes that are long in the fore-and-aft direction and have rectangular cross sections, and a front frame 21 extending between the front upper parts of the right and left main frames 20 and extending to and between the right and left edges of the body frame 2.

Right and left pipe frames 22, that also serve as handrails for getting on and off the vehicle, extend upwardly from the right-and-left rear portions of the front frame 21. The right and left support frames 23, that are pipes extending long in the vertical direction and have rectangular cross sections, extend from the right and left rear portions of the front frame 21.

A part of right and left pipe frames 22 and the right and left support frames 23 are covered by the box-like front seat support panel 24, and the front driver's seat 13 is fixed to this front seat support panel 24. The front driver's seat 13 includes a front seat bottom 13a fixed to the front portion of the front seat support panel 24, and a seat back 13b fixed to the middle support column 32 of ROPS (Roll Over Protective Structure) 30 described below.

Right and left backseat support frames 25 that are pipes with rectangular cross sections extend from the back end portion of the right and left main frames 20, and right and left rear frames 26, that are pipes with rectangular cross sections and are elongate in the fore-and-aft direction, extend rearwardly from an upper portions of the backseat support frames 25. The right and left side frames 27, which are round pipes formed into frames, span between and fixed to the right and left main frames 20 and the right and left rear frames 26.

The front deck board 28 is fixed to the upper surface of the main frames 20 forwardly of the pipe frames 22, thereby defining a floor top of the front portion of the driving section 5. The rear deck board 29 is fixed to the upper surface of the main frame 20 forwardly of the backseat support frames 25, thereby defining a floor top of the rear portion of the driving section 5.

The backseat 14 is fixed to upper parts of the backseat support frames 25. The backseat 14 includes a rear seat bottom 14a supported by the upper end portions of the backseat support frames 25 so as to be pivotable forwardly and rearwardly, and a seat back 14b fixed to the front side of the partition member 90 described below.

ROPS 30 includes a front support column 31, a middle support column 32, and right and left rear support columns 34, and thus is of a six-pillar type. The right and left brackets 21a are fixed to the right and left parts of the upper part of the front frame 21, the front support column 31 formed of round pipe material is fixed to the right and left brackets 21a. The middle support column 32 formed of a round pipe material is fixed to the upper part of the right and left support frames 23.

The first right and left brackets 31a are fixedly attached to the upper part of the front support column 31, and forwardly facing right and left second brackets 32a are fixedly attached to the right and left parts in the upper part of the middle support column 32. Right and left top front frames 33 formed of a round pipe material extend between and are fastened to be fixed to the first right and left brackets 31a and the second right and left brackets 32a. The reinforcing frames 32c are fixed to the lower parts of the right and left vertical frame portions 32b of the middle support column 32 and the reinforcing frames 32c function as handrails for the passengers sitting in the backseat 14.

Figure 14:
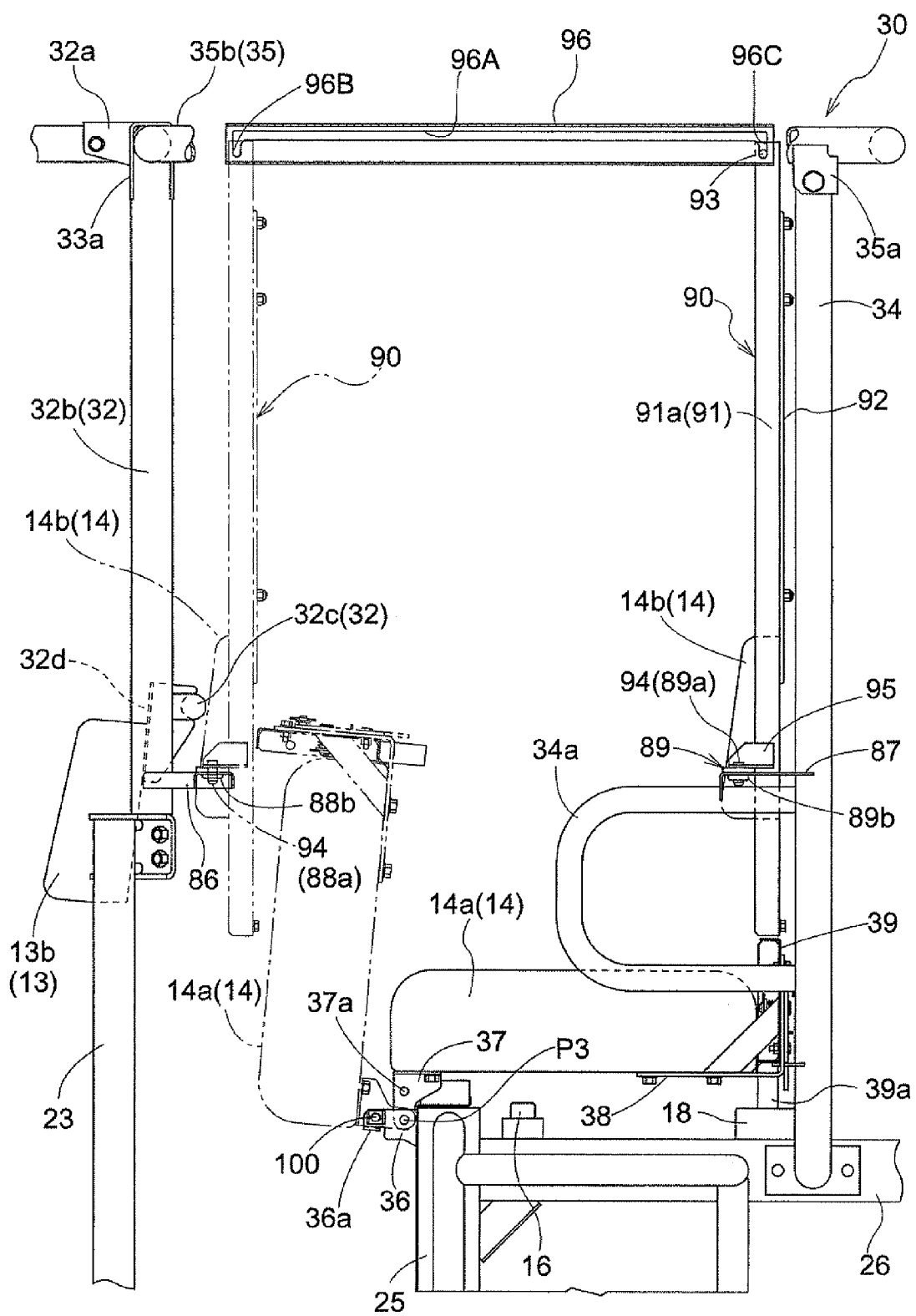
FIG. 14 is a side view of an area around the partition member.

The attachment brackets 32d are fixed to the reinforcing frames 32c, and the seat back 13b of the front driver's seat 13 is fastened and fixed to the front side of the attachment brackets 32d (see FIG. 14).

The top rear frame 35 is formed of a round pipe material, and the downward-facing right and left third brackets 33a are attached to front portions of this top rear frame 35. The third right and left brackets 33a are fastened to be removably fixed to the right and left portions of the upper part of the middle support column 32.

The left rear support column 34 formed of a round pipe material extends to the left and upwardly from and removably fixed to the left-hand side of the left rear frame 26, and the right rear support column 34 formed of a round pipe material extends to the right and upwardly from and removably fixed to the right hand side of the right rear frame 26, The fourth downward brackets 35a are fastened and fixed to the right and left portions of the rear of the top rear frame 35, and the upper ends of the right and left rear support columns 34 are fastened to be removably fixed to the fourth right and left brackets 35a.

Right and left handrails 34a formed of a round pipe material are fixedly attached to the lower parts of the right and left rear support columns 34, and these right and left handrails 34a may be grasped, for example, to assist in getting on and off the backseat.

The ROPS 30 of the six-pillar type can be changed into a ROPS of a four-pillar type by removing the right and left rear support columns 34 from the right and left rear frames 26, and removing the top rear frame 35 from the middle support column 32 since the rear support columns 34 and the top rear frame 35 are removably attached.

[Structural Detail of the Loading Floor]

Figure 4:
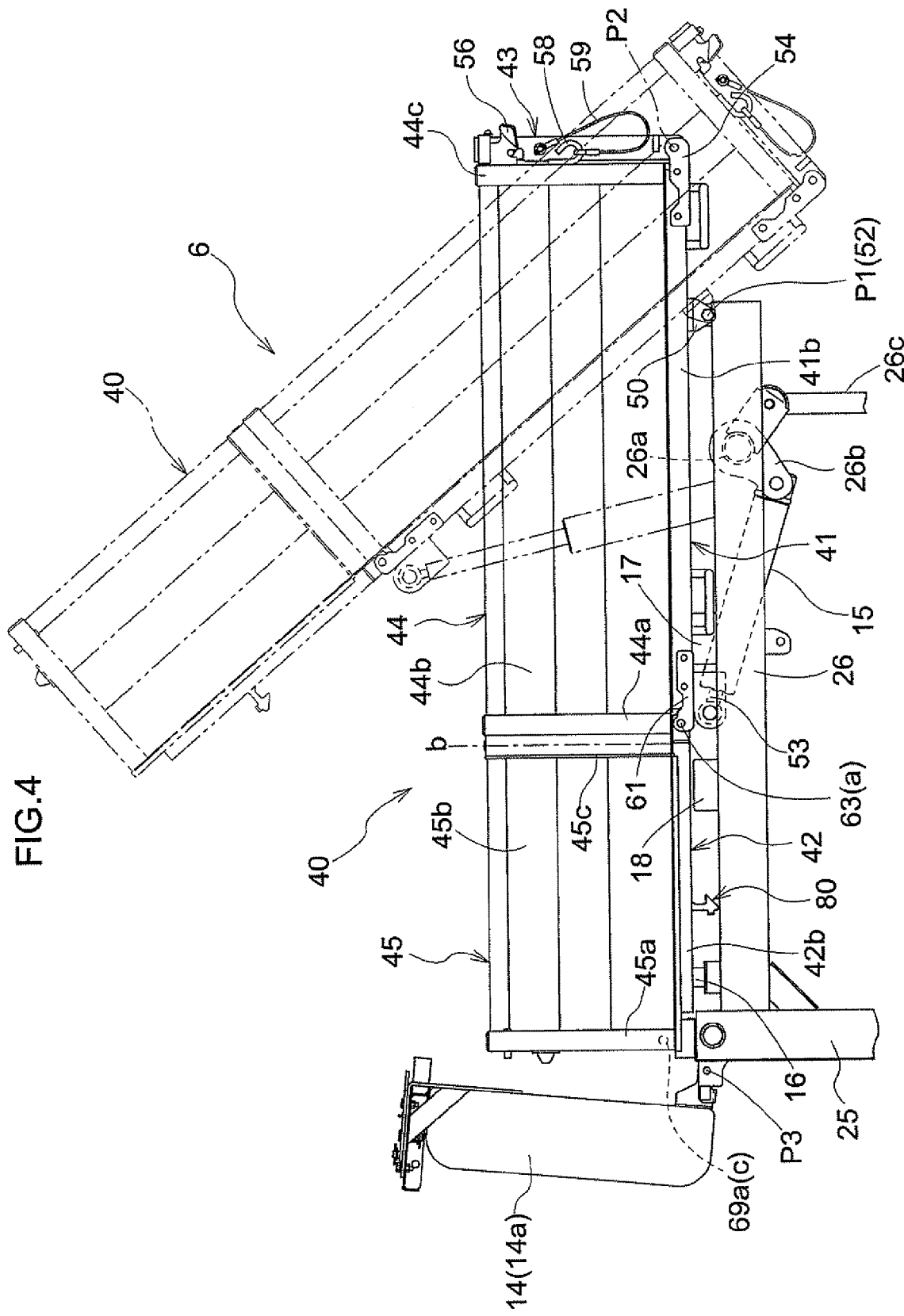
FIG. 4 is a side view of the area adjacent the loading floor in the extended state.
Figure 5:
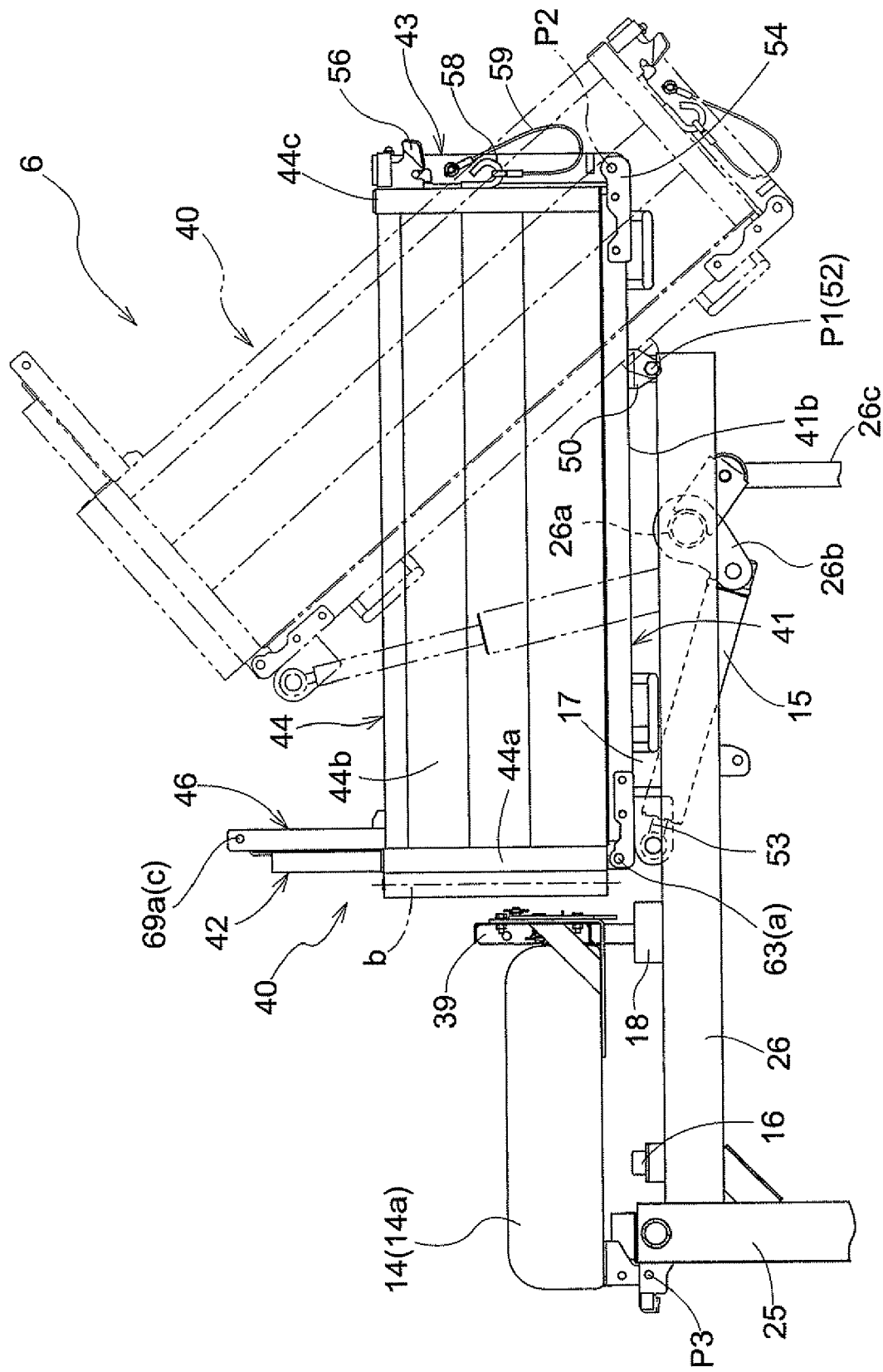
FIG. 5 is a side view of the area adjacent the loading floor in the shortened state.
Figure 6:
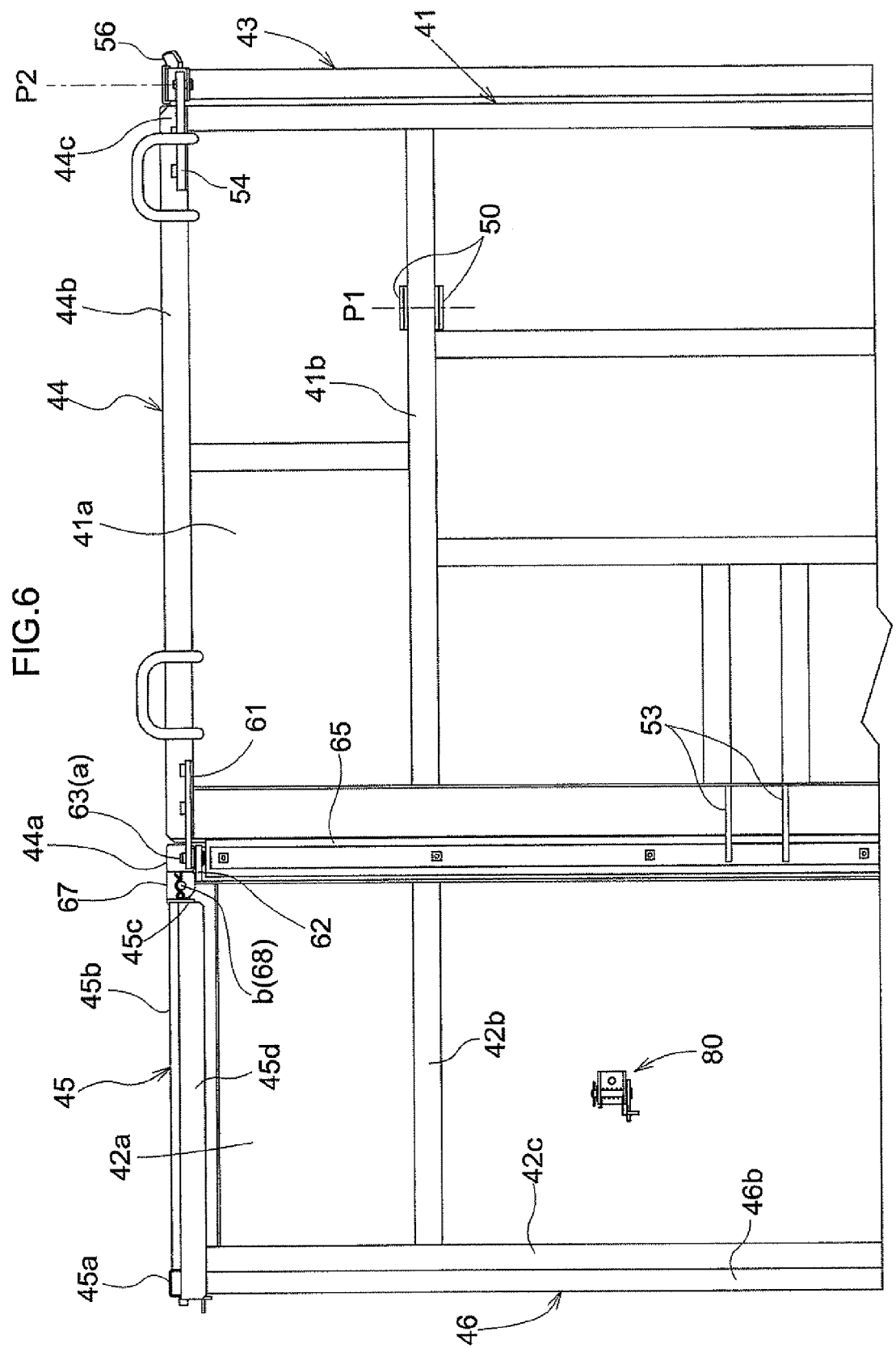
FIG. 6 is a bottom view of the loading floor in the extended state.

The structural detail of the loading floor 40 is described next with reference to FIGS. 4-12. FIG. 4 is a side view around the loading floor 40 in its extended state described below, and FIG. 5 is a side view around the loading floor 40 in its shortened or retracted state described below. FIG. 6 is a bottom view (i.e. the loading floor 40 as seen from the bottom) of the loading floor 40 in the extended state described below, FIG. 7 is a rear view of the loading floor 40, and FIG. 8 is a side view of a forward portion of the loading floor 40 in the extended state described below.

Figure 9A:
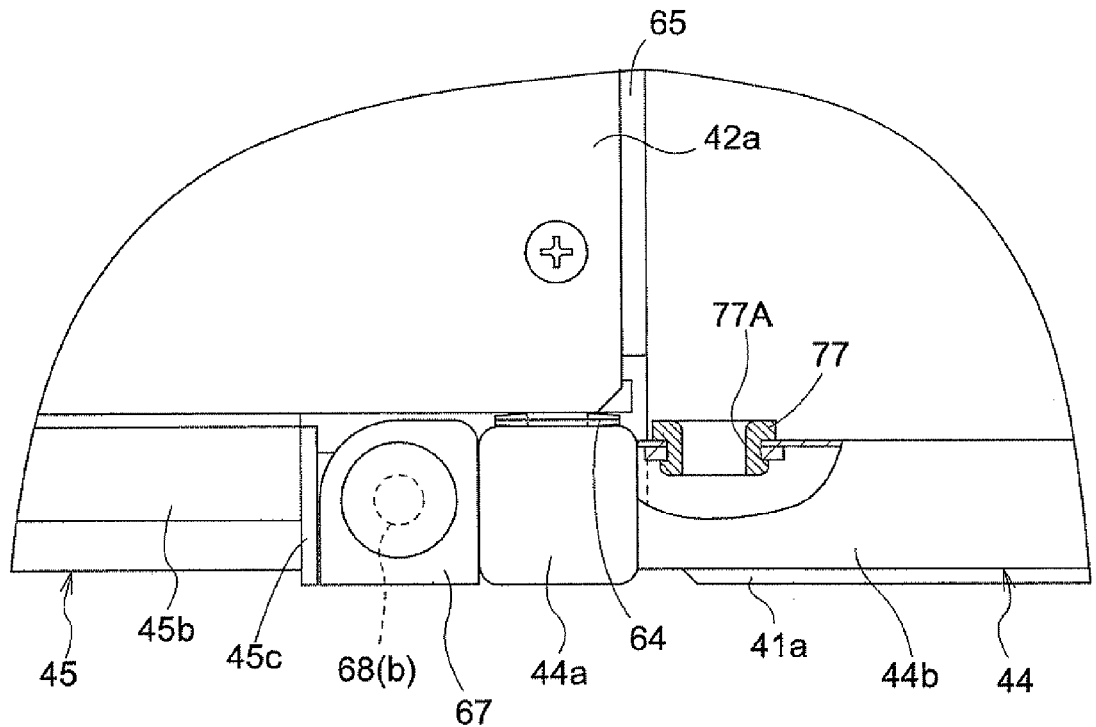
FIG. 9A is a drawing showing details of the connecting structure of the front bottom portion and the front side wall portion.
Figure 9B:
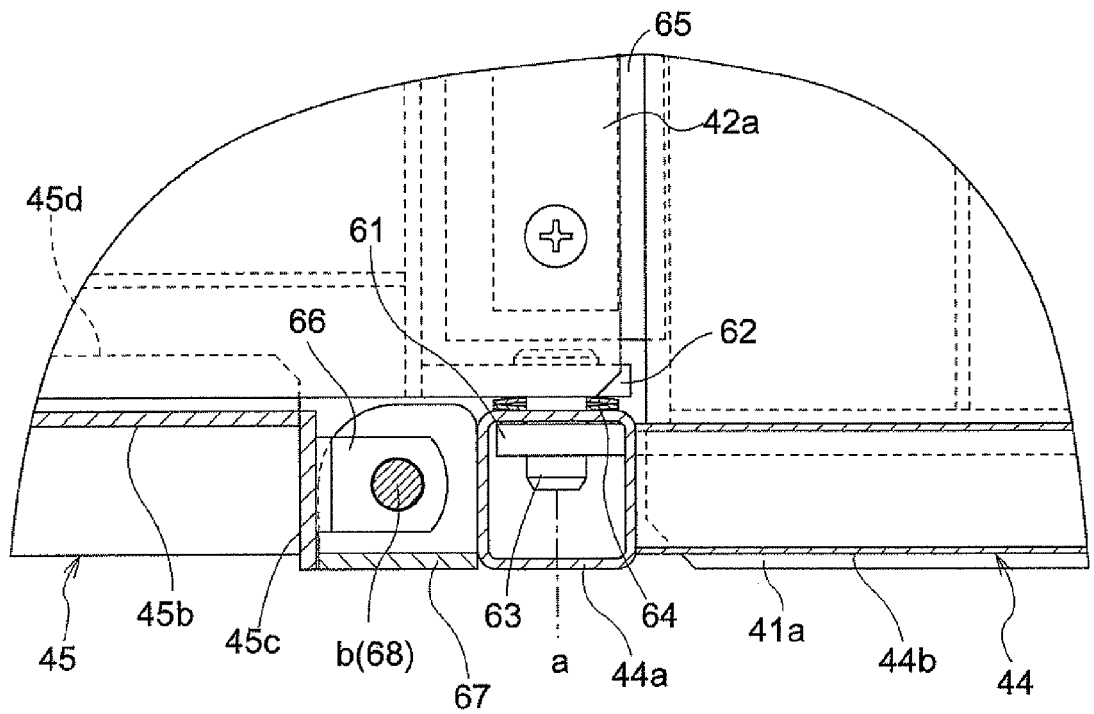
FIG. 9B is a drawing showing details of the connecting structure of the front bottom portion and the front side wall portion.
Figure 10A:
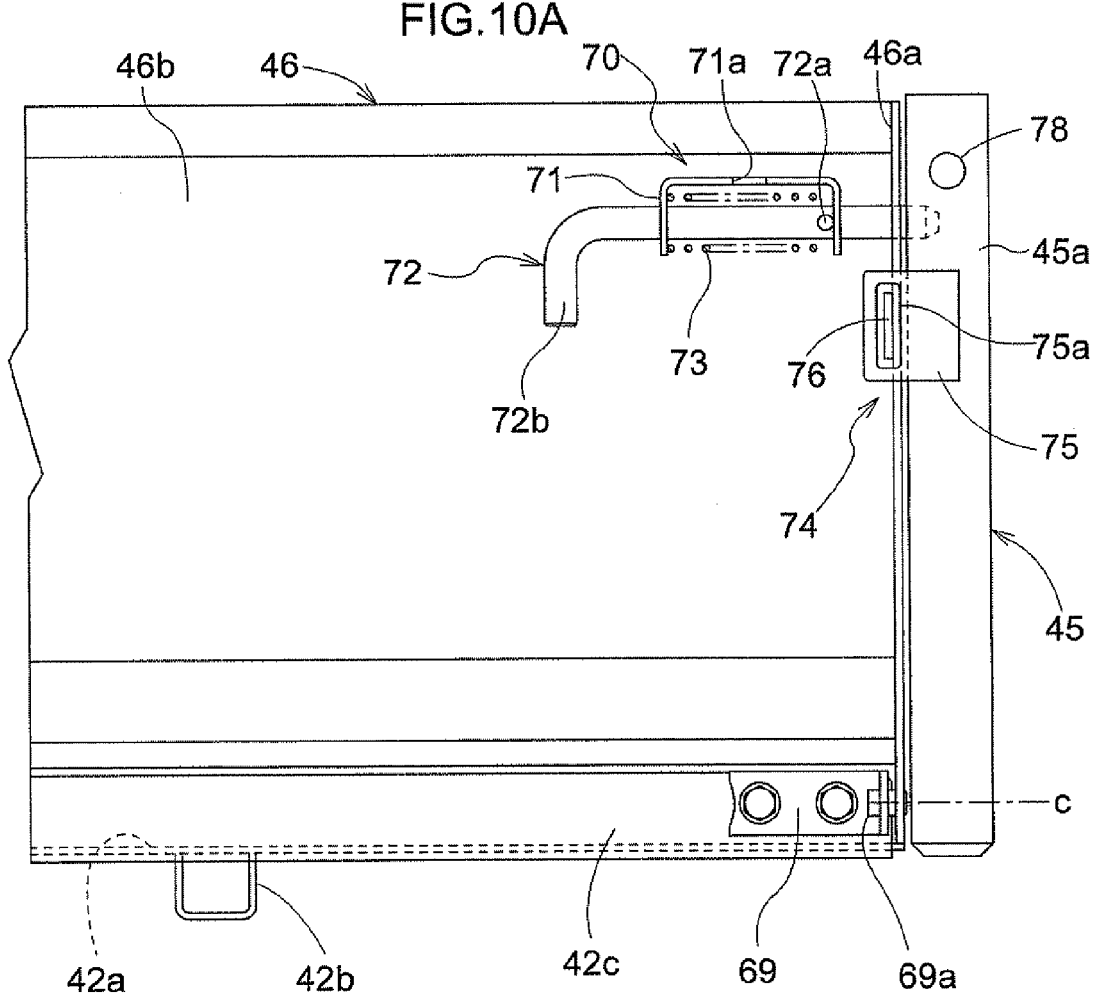
FIG. 10A is a drawing showing details of the connecting structure of the front wall.
Figure 10B:
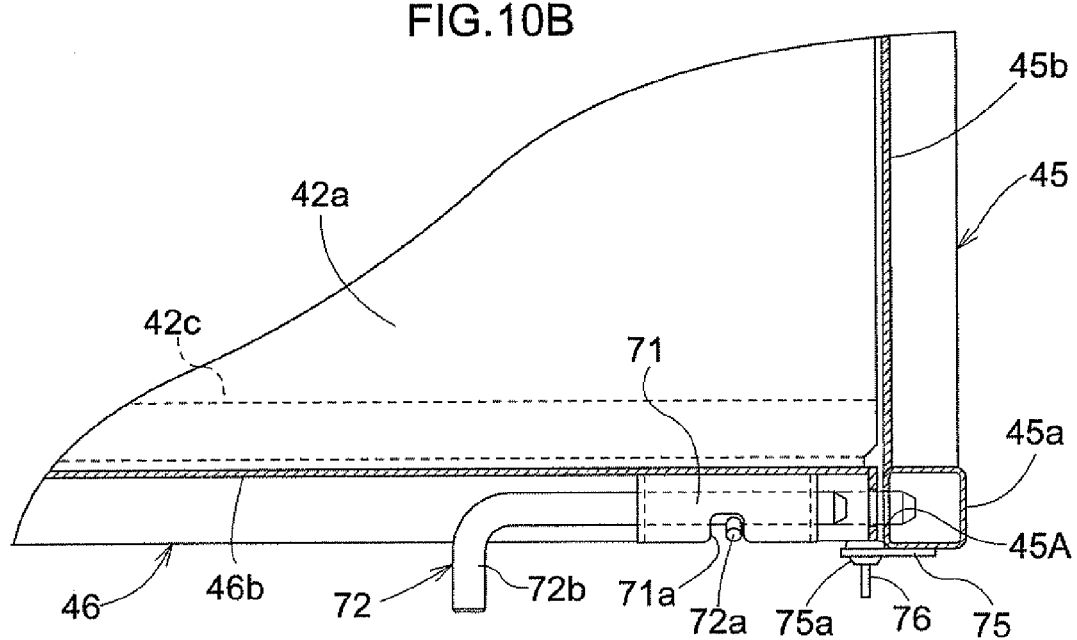
FIG. 10B is a drawing showing details of the connecting structure of the front wall.

FIGS. 9A and 9B are drawings showing details of the connecting structure of a front bottom portion 42 and a front side wall portion. And more particularly, FIG. 9A is a plan view showing the connecting portion of the front bottom portion 42 and the front side wall portion 45, and FIG. 9B is a cross sectional plan view showing the connecting portion of the front bottom portion 42 and the front side wall portion 45. FIGS. 10A and 10B are drawings showing details of the connecting structure of the front wall portion 46. And more particularly, FIG. 10A is a front view showing the connecting portion of the front wall portion 46, and FIG. 9B is a plan view showing the connecting portion of the front wall portion 46.

Figure 11A:
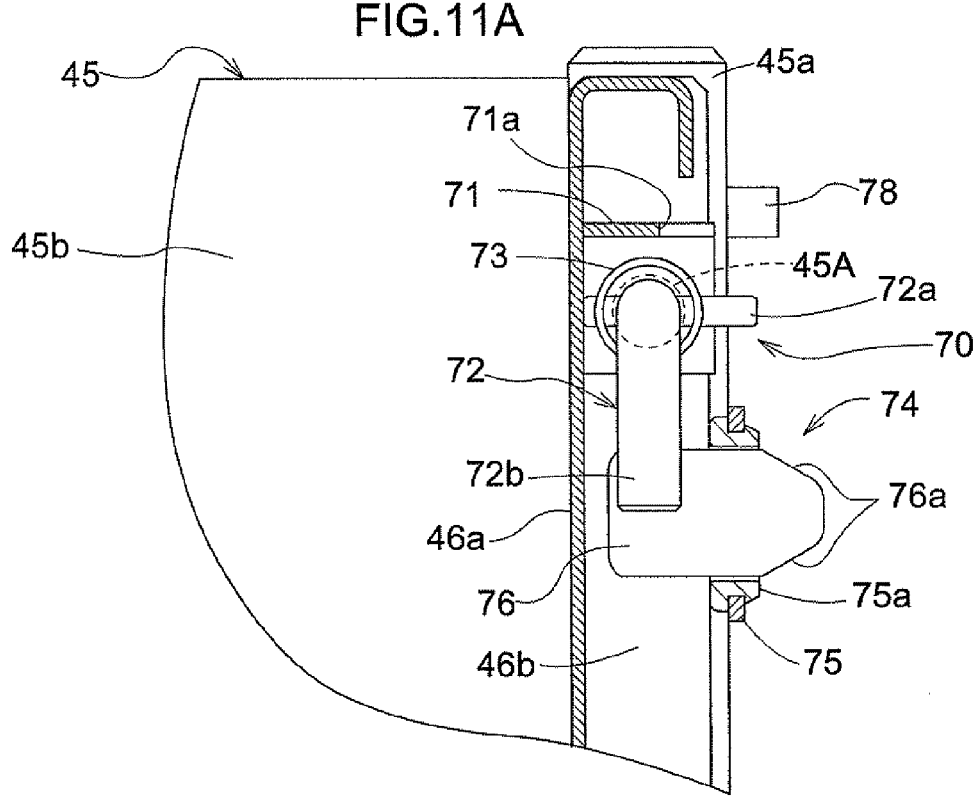
FIG. 11A is a vertical sectional side view showing the structure around the first locking device.
Figure 11B:
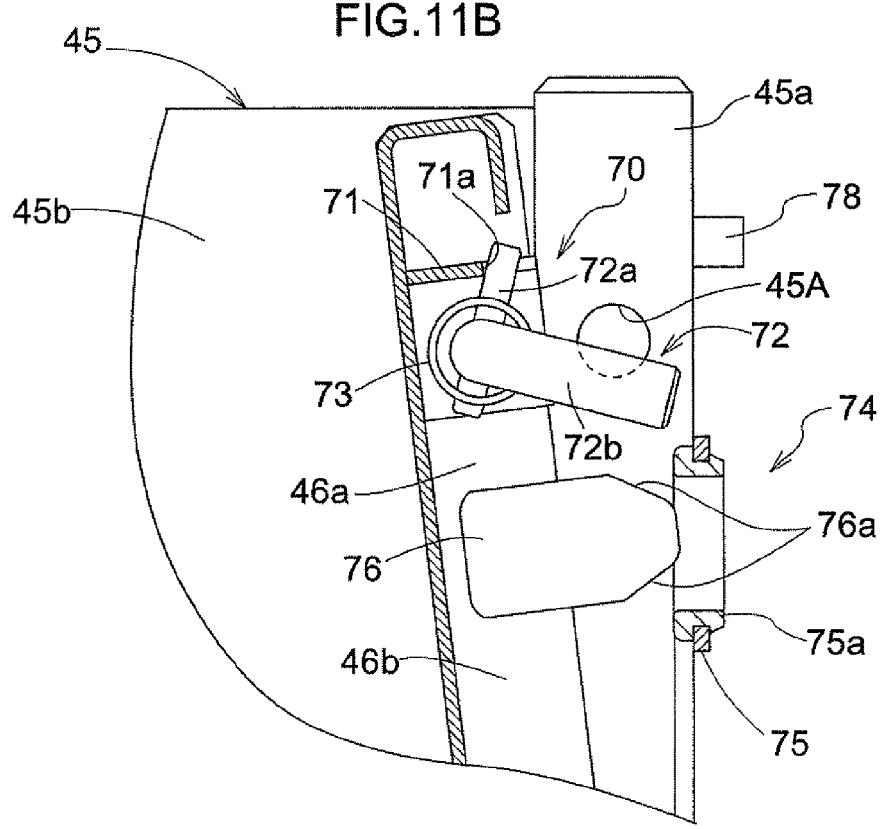
FIG. 11B is a vertical sectional side view showing the structure around the first locking device.
Figure 12A:
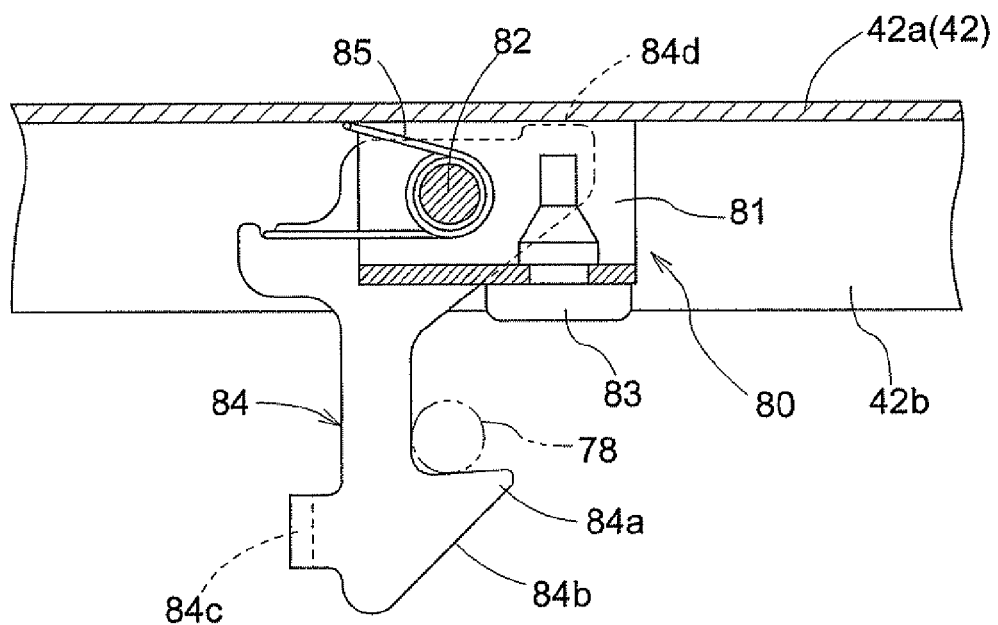
FIG. 12A is a drawing showing details of the structure around the second locking device.
Figure 12B:
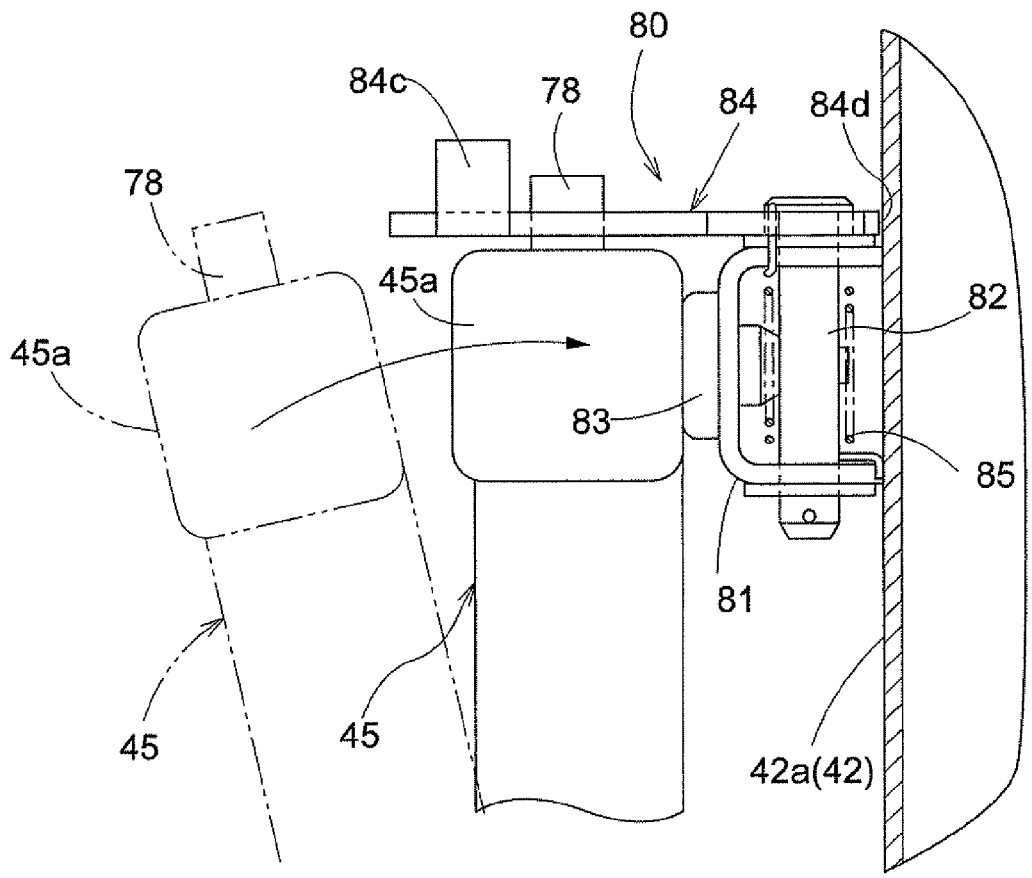
FIG. 12B is a drawing showing details of the structure around the second locking device.

FIGS. 11A and 11B are vertical sectional side views (as seen from the inside) showing the structure around the first locking device 70, wherein FIG. 11A is a vertical sectional side view of the first locking device 70 in the locked state, and FIG. 11B is a vertical sectional side view of the first locking device 70 in its unlocked state. FIGS. 12A and 12B are drawings showing details of the structure around the second locking device 80, and in particular, FIG. 12A is a vertical sectional side view of the area adjacent the second locking device 80 of the loading floor 40 in the extended state, and FIG. 12B is the plan view of the second locking-device 80 of the loading floor 40 in a shortened state.

As shown in FIGS. 4 and 5, the loading floor 40 is provided with the following: a rear bottom portion 41 for carrying the materials to be loaded, the front bottom portion 42 for carrying the materials, the rear wall portion 43 that defines the rear surface of the loading floor 40, the right and left rear side wall portions 44 which define or form the sides of the rear portions of the loading floor 40, the right and left forward side wall portions 45 which define the sides of the front portion of the loading floor 40, and the front wall portion 46 that defines the front surface of the loading floor 40. The state or configuration of the loading floor 40 can be changed between the extended state (or the first state), shown in FIG. 4, in which the front portion of the loading floor 40 (the front wall portion 46, the forward side wall portions 45, the front bottom portion 42) is moved forwardly so that the length of the loading floor 40 is extended and the shortened state (or the second state), shown in FIG. 5, in which the front portion of the loading floor 40 (the front wall portion 46, the forward side wall portions 45, the front bottom portion 42) is moved rearwardly so that the length of the loading floor 40 is shortened.

As shown in FIGS. 4, 6, and 7, the rear bottom portion 41 has a plurality of frames fixedly attached to the underside of the rear deck board 41a, and the upper surface of the rear deck board 41a defines a flat deck surface, without unevenness, for carrying loaded materials. Right and left rear main frames 41b that are long in the fore-and-aft direction are fixedly attached to the right and left side portions of the undersurface of the rear deck board 41a, and the vertical plate-like hinges 50 are fixedly attached to the rear portion of the right and left rear main frame 41b.

The brackets 51 are fixedly attached to the upper parts of the rear portions of the rear frames 26, and the hinge 50 of each of the rear main frames 41b is pivotably supported by the bracket 51 through a hinge pin 52 about the axis P1 extending in a lateral or a right-and-left direction.

A pair of right and left rod side brackets 53 are fixedly attached to a laterally central area of the front end portion of the rear bottom portion 41. A support frame 26a formed of a round pipe material extends between and fixedly attached to the right and left rear frames 26 and a pair of right and left tube side brackets 26b are fixedly attached to a laterally central area of this support frame 26a (see FIG. 3).

The right and left rear support frames 26c are connected with the right and left portions of the support frame 26a, and the front portions of the right and left rear support frames 26c extend downwardly and forwardly and are connected with the right and left main frames 20, etc.

The front support members 16 made of rubber or resin are fixed to the upper surfaces of the front ends of the right and left rear frames 26. When the loading floor 40 in the extended state is lowered, the front main frames 42b described below are supported by the front support members 16, and thus, the front of the loading floor 40 in the extended state is supported by the rear frame 26. The rear support members 17 made of rubber or resin are fixed to the upper surfaces of central areas in the fore-and-aft direction of the right and left rear frame 26. And when the loading floor 40 in the extended state or the shortened state is lowered, the rear main frames 42b are supported by the rear support members 18, and thus, the central portion in the fore-and-aft direction of the loading floor 40 in the extended state and the front portion of the loading floor 40 in the shortened state are supported by the rear frames 26.

The seat support members 18 are fixed to the upper surfaces of the front portions of the right and left rear frames 26, and the rear portion of the rear seat bottom 14a in a prone posture, described below, is supported by this seat support member 18. The heights of the upper end of the front and the rear support members 16 and 17 are set at the same height, and the height of the upper ends of the seat support members 18 is set to be lower than the height of the upper ends of the front and the rear support members 16 and 17. This forms a predetermined space "a" between the upper surface of the seat support members 18 and the front main frames 42b.

A hydraulic raising and lowering cylinder 15 which raises and lowers the loading floor 40 extends between and attached to the rod side bracket 53 and the tube side bracket 26b. The raising and lowering cylinder 15 is a double acting cylinder, and its piston rod side and the piston head side are connected to the operation valve (not shown) through hydraulic conduits. Thus, hydraulic fluid under pressure is supplied from the operation valve to the piston head side by operating a loading-platform raising and lowering lever or a loading-platform raising and lowering switch (not shown) provided in the driving section 5, the raising and lowering cylinder 15 extends to raise the loading floor 40. Conversely, hydraulic fluid under pressure is supplied from the operation valve to the piston rod side by operating the loading-platform raising and lowering lever or a loading-platform raising and lowering switch provided in the driving section 5, the raising and lowering cylinder 15 is shortened or retracted to lower the loading floor 40.

Each of the right and left rear side wall portions 44 includes a rectangular-pipe-shaped front support column 44a, a rectangular pipe shaped rear support column 44c, and a rear side panel 44b that extends between and fixedly attached to the front support column 44a and the rear support column 44c. The rear side panel 44b is formed by bending or press-bending a row material. The right and left rear side wall portions 44 are fixed to the upper surfaces of the right and left ends or edges of the rear deck board 41a.

The right and left brackets 54 are fastened and fixed to the back end portions of the rear bottom portion 41, and the rear wall portion 43 is pivotably supported by the back end portion of the bracket 54 about a laterally extending axis P2.

The opening-and-closing lever 55 is pivotably supported by the upper part of the right and left portions of the rear wall portion 43 about the axis extending in the fore-and-aft direction, and a metal fitting 56 which engages with the lock portion 55a of the opening-and-closing lever 55 is fixed to an upper part of a rear support column 44c of the rear side wall portion 44. An elastic spring 57 is arranged between the opening-and-closing lever 55 and the rear wall portion 43, and the lock portion 55a of the opening-and-closing lever 55 is urged by the elastic spring 57 in a direction to engage the metal fittings 56. The rear wall portion 43 can be pivoted to be opened rearwardly to a top-open orientation and closed by pivoting the control member 55b of the opening-and-closing lever 55 against the urging force of the elastic spring 57.

A hook 58 is fixedly attached to a rear support column 44c of the rear side wall portion 44, and an end portion of the wire 59 is pivotably supported by a side of the rear wall portion 43 about a laterally extending axis. Thus, when the rear wall portion 43 is pivoted rearwardly with the other end portion of the wire 59 hooked on the hook 58, the range of a downward pivot of the rear wall portion 43 is limited by the wire 59 so that the rear wall portion 43 and the deck face of the rear deck board 41a are maintained to be flush with each other. On the other hand, when the rear wall portion 43 is pivoted rearwardly with the other end portion of the wire 59 is released from the hook 58, the rear wall portion 43 will pivot to a straight-down orientation.

The front bottom portion 42 has a plurality of frames fixedly attached to the underside of the front deck board 42a, and the upper surface of the front deck board 42a defines a flat deck surface, without unevenness, for carrying loaded materials, that is flush with the rear deck plate 41a. Right and left front main frames 42b, that are long in the fore-and-aft direction, are fixedly attached to the right and left portions of the underside of the front deck board 42a. The right and left front main frames 42b are arranged to be at the same positions as the right and left rear main frames 41b in the lateral direction, and the height of the undersurface of the right and left front main frames 42b is set to be the same height as the height of the undersurface of the right and left rear main frames 41b.

As shown in FIGS. 6, 8, and 9, vertical and plate-like right and left brackets 61 are fastened and fixed to the right and left end portions of a front portion of the rear bottom portion 41, and vertical plate-like brackets 62 are fixed to the right and left end portions of the rear portion of the front bottom portion 42. Each of the right and left brackets 62 of the front bottom portion 42 is supported by the respective bracket of the rear bottom portion 41 through a disk or conical spring 64 so as to be pivotable about an axis of a laterally extending pin 63. Thereby, the front bottom portion 42 is supported to be vertically pivotably by the front end of the rear bottom portion 41 about a laterally extending axis a.

A plate-shaped member 65 having a band-plate shape that is long in the lateral direction is fixed to the underside of a rear end portion of the front deck board 42a, and a plate-shaped member 45d having a band-plate shape that is long in the fore-and-aft direction is fixed to the underside of each of the right and left front side wall portions 45. Because of this structure, when the front bottom portion 42 is pivoted forwardly from an elected or upstanding position about the laterally extending axis a, the plate-shaped member 65 abuts the forward underside of the rear deck board 41a, and the right and left side portions of the front deck board 42a abut the upper surfaces of the right and left plate-shaped members 45d. And the front bottom portion 42 is maintained in a proper position in which the upper surface of the front deck board 42a is flush with the upper surface of the rear deck board 41a.

In this case, the gap between the back end of the front deck board 42a and the front end of the rear deck board 41a is closed by the plate-shaped member 65, and the gaps between the front deck board 42a and the front side wall portions 45 are closed by 45d of plate-shaped members. This structure prevents loaded materials from falling from these gaps.

Each of the forward side wall portions 45 includes a rectangular pipe-shaped front support column 45a, a vertical plate-like rear frame 45c, and a front side panel 45b that extends between and fixedly attached to the front support column 45a and the front side panel 45b. The front side panel 45b is formed by bending or press-bending a row material. Upper and lower brackets 66 are fixed to the rear surface of each of the rear frames 45c of the forward side wall portions 45. The frame 67, whose the upper and the lower end portions are bent inwardly, is fixed to the front side of the front support column 44a of each of the rear side wall portions 44. The upper and lower brackets 66 fixed to the rear frame 45c are supported to the frame 67 by the pin 68 to be pivotable about a vertically extending axis b. Thereby, each of the forward side wall portion 45 is supported by the front end of the rear side wall portion 44 to be pivotable laterally or to the right and left about the vertically extending axis b.

As shown in FIGS. 8 and 10, the front wall portion 46 includes right and left side frames 46a having a vertical plate shape, and a front panel 46b which extends between and fixedly attached to the side frames 46a. The front panel 46b is formed by bending or press-bending a row material. The lower end portion of each side frame 46a extends to a point lower than the front panel 46b.

A frame 42c having an L-shaped vertical cross section is fixedly attached to the front end of the front deck board 42a, and a bracket 69 having an L-shaped lateral cross-section is fixed to each of the right and left ends of this frame 42c. The laterally extending pin 69a is fixedly attached to the bracket 69, and the lower end portion of the side frame 46a is supported by this pin 69a to be rotatable about the laterally extending axis c. Thereby, the front wall portion 46 is supported by the front end of the front bottom portion 42 to be pivotable forwardly and rearwardly about the laterally extending axis c.

As shown in FIGS. 10 and 11, the upper parts of the right and left portions of the front wall portion 46 have first locking devices 70 that fix or lock the front wall portion 46 to the right and left forward side wall portions 45. Each of the first locking devices 70 includes a bracket 71, an operating member 72, and an elastic spring 73. The bracket 71 has a downwardly opening bracket-shape as seen from the front and is fixedly attached to the front panel 46b of the front wall portion 46. The laterally extending through hole is formed in the bracket 71, and the operating member 72 is inserted into this through hole.

A laterally extending lock hole 45A is formed in the upper part of the front support column 45a of each of the forward side wall portions 45, and the distal end portion of the operating member 72 is adapted to enter the lock hole 45A. With this structure, the upper parts of the right and left portions of the front wall portion 46 are supported by the right and left forward side wall portion 45 by the engagement of the distal end portion of the operating member 72 with the lock hole 45A.

A bar-shaped positioning member 72a is fixed to the operating member 72, and an elastic spring 73 which urges the operating member 72 laterally outwardly is arranged between the positioning member 72a and the bracket 71. An forwardly opening hole or recess portion 71a is formed in the upper surface of the bracket 71. And the operating member 72 can be held in the position where the operating member 72 is pulled inwardly (lock release state of the first locking device 70) by pulling the control member 72b of the operating member 72 inwardly against the urging force of the elastic spring 73, and by pivoting the operating portion 72b of the operating member 72 upwardly to engage the positioning member 72a with the hole portion 71b.

With the distal end portion of the operating member 72 aligned with the lock hole 45A of the front support column 45a, by pivoting the operating portion 72b of the operating member 72 downwardly from the position in which the positioning member 72a engages the hole portion 71b of the bracket 71, the distal end portion of the operating member 72 is inserted into the lock hole 45A of the front support column 45a by the urging force of the elastic spring 73, thereby, the upper parts of the right and left portions of the front wall portion 46 are supported by the right and left forward side wall portions 45 (lock state of the first locking device 70).

A positioning mechanism 74A is provided below one or both of the first locking-devices 70. The positioning mechanism 74 includes a plate-shaped member 75 fixed to the front side of the front support column 45a, and an engaging piece 76 fixed to the side frame 46a of the front wall portion 46. The plate-shaped member 75 includes an inserted member 75a made of resin, which is fit into the member 75, and the hole portion formed in this inserted member 75a, to be engaged with the engaging piece 76.

When the front wall portion 46 is pivoted upwardly to its erect or upstanding position from the forwardly extending prone position about the laterally extending axis C, the engaging piece 76 fixed to the front wall portion 46 enters the hole portion of the inserted member 75a fixed to the forward side wall portion 45 side, whereby, the front wall portion 46 and the forward side wall portion 45 are aligned with each other in the lateral direction. When this occurs, since the inclining portion 76a is formed in the distal end portion of the engaging piece 76, the distal end portion of the engaging piece 76 guided by this inclining portion 76a enters the hole portion of the inserted member 75a without difficulty.

In addition, the front ends of the side frames 46a of the front wall portion 46 abut the rear surface of the inserted member 75a, whereby the front wall portion 46 and the forward side wall portion 45 are appropriately positioned in the fore-and-aft direction. Thereby, the position of the front end of the operating member 72 and the position of the lock hole 45A of the front support column 45a can be aligned or positioned correctly.

For example, even if a force from the loaded materials on the loading floor 40 acts on the front of the forward side wall portion 45 to pivot it laterally outwardly about the vertically extending axis b, the engagement between the plate-shaped member 75 and the engaging piece 76 will be able to support and counter such force that tends to pivot the forward side wall portion 45 laterally outwardly. Also, even if a force from the loaded materials on the loading floor 40 acts on an upper portion of the forward wall portion 46 to pivot ti forwardly about the laterally extending axis c, the abutment between the forward ends of the side frames 46a and the back surface of the inserted member 75a will be able to support and counter such forwardly pivoting force. Thus, the positioning member 74 can also function as a connection reinforcement member for the front wall portion 46 and the forward side wall portions 45, whereby the strength of the loading floor 40 can be improved.

As shown in FIGS. 8 and 9, a laterally extending through hole is formed in a forward upper area of each of the rear side panels 44b of the rear side wall portions 44, and a boss member 77 made of resin is fit into this through hole. A laterally extending lock hole 77A is formed in the boss member 77, and the inside diameter of this lock hole 77A is dimensioned to accommodate a distal or free end of the operating member 72 of the first locking device 70 without difficulty. The positioning of each of the boss member 77 (lock hole 77A) is set to be at such a position that, when the first locking devices 70 are operated to the lock state with the front bottom portion 42 and the front wall portion 46 raised together to their upstanding positions, the distal end portion of each of the operating members 72 enters the respective lock hole 77A so that the front bottom portion 42 and the front wall portion 46 remain in their substantially upstanding positions.

This arrangement allows the first locking device 70 for fixing the front wall portion 46 to the right and left forward side wall portions 45 in the extended state of the loading floor 40 to also function as a locking device for fixing the front wall portion 46 and the front bottom portion 42 to the rear side wall portions 44 when the loading floor 40 in its shortened state (in which the front wall portion 46 and the front bottom portion 42 are raised together).

As shown in FIGS. 6 and 8, provided on the underside of the right and left portions of the front deck board 42a are second locking devices 80 for fixing inner side end positions of the forward side wall portions 45 to the front bottom portion 42 when the front bottom portion 42 is raised rearwardly and the forward side wall portions 45 are folded inwardly of the vehicle.

As shown in FIG. 12A, each second locking device 80 includes a bracket 81, a pivot 82, a pivot arm 84, and an elastic spring 85. The bracket 81 is fixedly attached to the undersurface of the front deck board 42a. Laterally facing right and left through holes are formed in the bracket 81, and the pivot 82 is inserted in the through holes. A vertically extending attachment hole is formed in the bracket 81, and a rubber or cushion member 83 made of resin is internally fit in this attachment hole.

A plate-like pivot arm 84 is supported, at the right-hand side end of the pivot 82, to be pivotable about the laterally extending axis of the pivot 82. An elastic spring 85 is attached between the front deck board 42a and the pivot arm 84 in the pivot 82, and the pivot arm 84 is urged by this elastic spring 85 counterclockwise in FIG. 12A about the axis of the pivot 82.

A lock pin 78 that extends in the fore and aft direction is fixedly attached to an upper portion of each of the front support columns 45a of the forward side wall portion 45 (see FIGS. 11A and 11B). Formed in the lower part of the pivot arm 84 are an engaging portion 84a for engaging the lock pin 78 of the front support column 45a, a guide portion 84b that is inclined upwardly and rearwardly for guiding the lock pin 78 of the front support column 45a, and an operating portion 84c bent inwardly from the pivot arm 84. An abutting portion 84d for abutting the front deck board 45a to restrict the pivoting range of the pivot arm 84 is formed in an upper portion of the pivot arm 84.

Since the abutting portion abuts the under side of the front deck board 45a by the urging force of the elastic spring 85, the pivot arm 84 can pivot about the axis of the pivot 82 in the clockwise direction in FIG. 12A from the position shown in FIG. 12A.

When a front side wall 46 is folded or pivoted inwardly of the vehicle body with the front deck 45 raised rearwardly to its upstanding position as shown in FIG. 12B, the lock pin 78 of the front side wall 46 abuts the guide portion 84b of the pivot arm 84 to pivot the pivot arm 84 upwardly about the laterally extending axis of the pivot 82. And when the lock pin 78 of the front side wall 46 is moved back further, the pivot arm 84 is pivoted downwardly about the laterally extending axis of the pivot 82 by the urging force of the elastic spring 85, and the engaging portion 84a of the pivot arm 84 engages the lock pin 78 of the forward side wall portion 45 (i.e. the second locking device 80 in lock state).

When this occurs, since the front support column 45a of each of the forward side wall portions 45 abuts the cushion member 83, the front support column 45a is held between the cushion member 83 and the engaging portion 84a of the pivot arm 84 without any gap in the fore and aft direction. This prevents the inner side ends of the forward side wall portions 45 from moving and rattling when the front bottom portion 42 is pivoted rearwardly to its upstanding position and the forward side wall portions 45 are folded inwardly of the vehicle body.

Thus, the inner side ends of the forward side wall portions 45 can be fixed to the forward deck 45 automatically with the second locking devices 80 by folding the forward side wall portions 45 inwardly of the vehicle body with the front bottom portion 42 pivoted rearwardly to its upstanding position. This allows for a simple and easy change in the positioning or the state of the loading floor 40, improving such changeover operation of the loading floor 40.

On the other hand, if the operating portion 84c of the pivot arm 84 is raised against the urging force of the elastic spring 85 with the front deck 45 raised rearwardly to its upstanding position and the forward side wall portions 45 folded inwardly of the vehicle body, the engaging portion 84 is disengaged from the lock pin 78, and the forward side wall portions 45 can now be pivoted forwardly (i.e. second locking device 80 in lock release state). When the forward side wall portion 45 pivoted forwardly and the operating portion 84c of the pivot arm 84 is released, the abutting portion 84d of the pivot arm 84 abuts the front deck board 42a, and the pivot arm 84 will be positioned at the original state (shown in FIG. 12A).

[Switching of the Loading Floor Between the Extended State and the Shortened State]

Figure 13A:
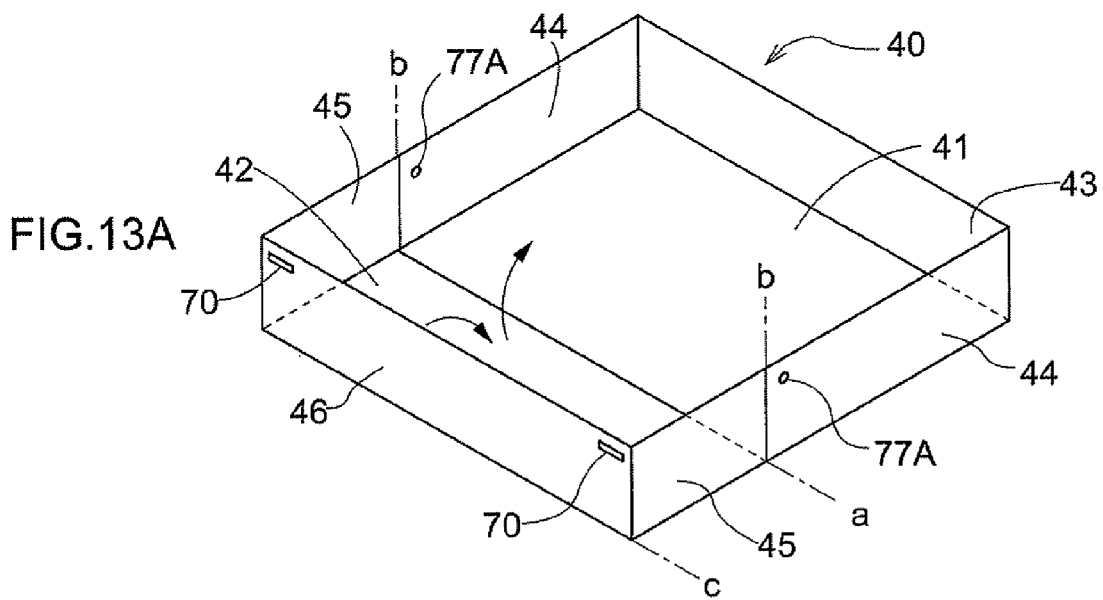
FIG. 13A is a schematic perspective view showing a size change of the loading floor.
Figure 13B:
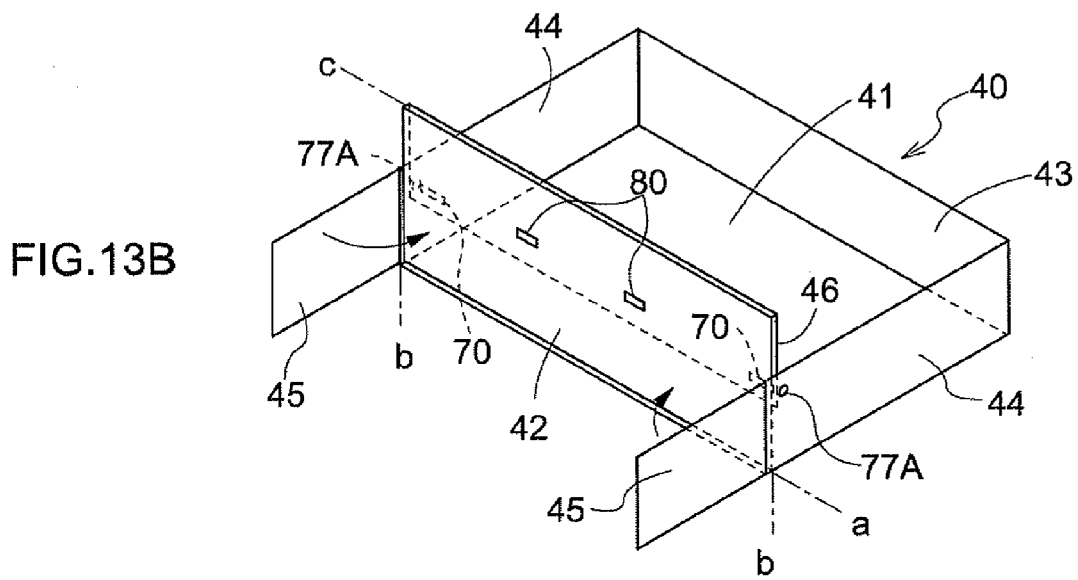
FIG. 13B is a schematic perspective view showing the size change of the loading floor.
Figure 13C:
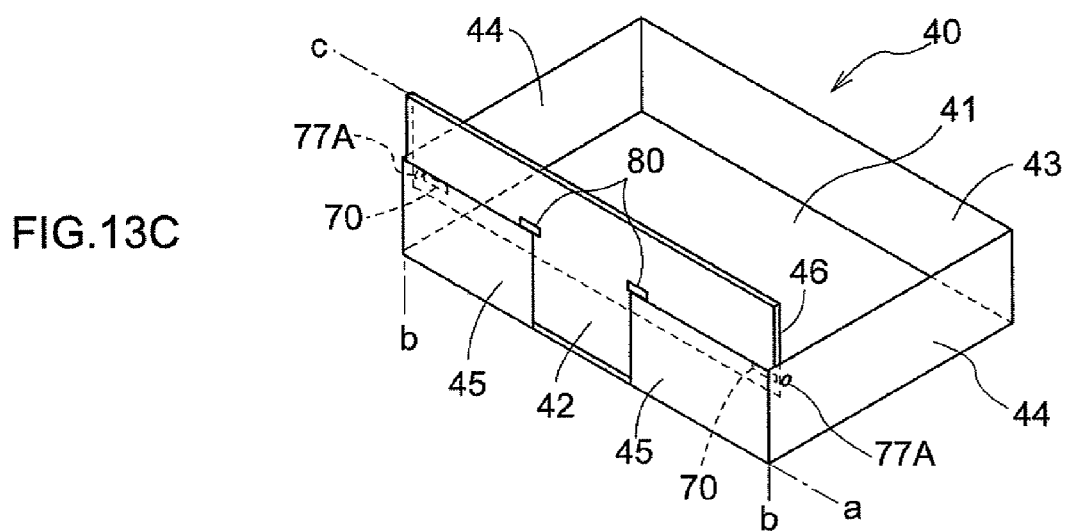
FIG. 13C is a schematic perspective view showing the size change of the loading floor.

With reference to FIGS. 13A, 13B, and 13C, the operation of the loading floor size changeover mechanism is described next, which has the folding structure mentioned above for performing the loading-platform size changeover between the extended state in which the loading floor 40 is enlarged or extended and the shortened states in which the loading floor 40 is converted to a smaller size or shortened. FIG. 13A, 13B, and 13C are schematic perspective views showing a size change of the loading floor 40. More particularly, FIG. 13A is a schematic perspective view of the loading floor 40 in the extended state, FIG. 13B is a schematic perspective view of the loading floor 40 in an intermediate state between the extended state and the shortened state, and FIG. 13C is a schematic perspective view of the loading floor 40 in the shortened state.

As shown in FIGS. 13A and 13B, the right and left first locking devices 70 are operated to the lock release state, and the front wall portion 46 is pivoted rearwardly about the laterally extending axis c and then the front wall portion 46 is folded toward the front bottom portion 42. And the front wall portion 46 and the front bottom portion 42 are pivoted rearwardly about the laterally extending axis a to their upstanding positions. The position of the first locking device 70 is aligned with the lock holes 77A formed in the boss members 77 of the rear side wall portions 44, and the first locking device 70 is operated to the lock state. This fixes the front wall portion 46 and the front bottom portion 42 to the right and left rear side wall portions 44.

As shown in FIGS. 13B and 13C, the right and left front side wall portions 45 are pivoted rearwardly (inwardly) about the vertically extending axis b to fold the front side wall portions 45 toward the front bottom portion 42 in its erect or upright position. This causes the lock pins 78 of the right and left forward side wall portions 45 to engage the right and left second locking devices 80 of the front bottom portion 42. This fixes the right and left front side wall portions 45 to the front bottom portion 42 in its erect or upright position.

As shown in FIG. 13C, the size of the loading floor 40 can be switched from the extended state in which the fore-and-aft length of the loading-platform 40 (i.e. the total length of the loading floor 40) is extended, to the shortened state in which the length of the loading floor 40 (i.e. the total length of the loading floor 40) is shortened by folding the front wall portion 46, the front bottom portion 42, and the right and left front side wall portions 45 in accordance with the procedure described above. In this case, the state of the loading floor 40 can be switched simply and quickly through use of the first and second locking devices 70 and 80 without a need to use any specific tools, thus improving efficiency of the size change operation of the loading floor 40.

And, the deck face of the front bottom portion 42 located in the inside of the loading floor 40, the inside surface (rear surface) of the front wall portion 46, and the inside of the forward side wall portion 45 in the extended state of the loading floor 40 are not exposed to the outside of the loading floor 40 in the shortened state of the loading floor 40. This prevents degradation in appearance of the loading floor 40 by the exposure of the deck face of the front bottom portion 42 damaged by the loaded materials on the loading floor 40, the inside surface (rear surface) of the front wall portion 46, and the inside surface of the forward side wall portion 45 in the shortened state of the loading floor 40.

And, the material is loaded into the portion surrounded by the deck face of the rear bottom portion 41, the inside surfaces of the right and left rear side wall portions 44, the inside surface (front face) of the rear wall portion 43, and the deck face (rear surface) of the front bottom portion 42 in the shortened state of the loading floor 40. This prevents any damages to the external surfaces of the loading floor 40 by loading the loaded material.

When the right and left forward side wall portions 45 are fixed to the front bottom portion 42 in the erect or upright position as shown in FIGS. 13B and 13C, the right and left second locking devices 80 are operated to the lock release state, and the right and left front side wall portions 45 are pivoted forwardly (outwardly) about the vertically extending axis b. When this occurs, the brackets 66 supported to the forward side wall portion 45 abut the frame 67 supported to the rear side wall portion 44, thus placing the forward side wall portions 45 in position in which they extend in the fore-and-aft direction.

Next, as shown in FIGS. 13A and 13B, the right and left first locking devices 70 are operated to the lock release state, and the front wall portion 46 and the front bottom portion 42 are pivoted together forwardly (downwardly) about the laterally extending axis a. When this happens, the plate-shaped member 65 of the front bottom portion 42 abuts the front underside of the rear deck board 41a, and the right and left portions of the rear deck board 42a abut the upper surface side of the right and left plate-shaped members 45d to place and maintain the front deck board 42a and the rear deck board 41a in position where the upper surface of the front deck board 42a is substantially flush with the upper surface of the rear deck board 41a.

And the front wall portion 46 is pivoted forwardly (upwardly) about the laterally extending axis c and the right and left first locking device 70 are operated to the lock state. When this occurs, the forward wall portion 46 and the forward side wall portions 45 are placed and maintained in proper position in the fore-and-aft direction and the lateral direction by the positioning mechanisms 74. The position of the distal end portion of each operating member 72 and the position of the lock hole 45A of the corresponding forward side wall portion 45 are aligned with each other. This fixes the front bottom portion 42, the front wall portion 46 and the right and left front side wall portions 45.

As shown in FIG. 13A, the state of the loading floor 40 can be switched from the shortened state in which the length of the loading floor 40 (i.e. the total length of the loading floor 40) is shortened, to the extended state in which the fore-and-aft length of the loading-platform 40 (i.e. the total length of the loading floor 40) is extended by unfolding the right and left front side wall portions 45, the front wall portion 46, and the front bottom portion 42 in accordance with the procedure described above. In this case, the state of the loading floor 40 can be switched or changed simply and quickly through use of the first and second locking devices 70 and 80 without a need to use any specific tools, thus improving efficiency of the state change operation of the loading floor 40.

[Detailed Structure of the Partition Member]

Figure 15:
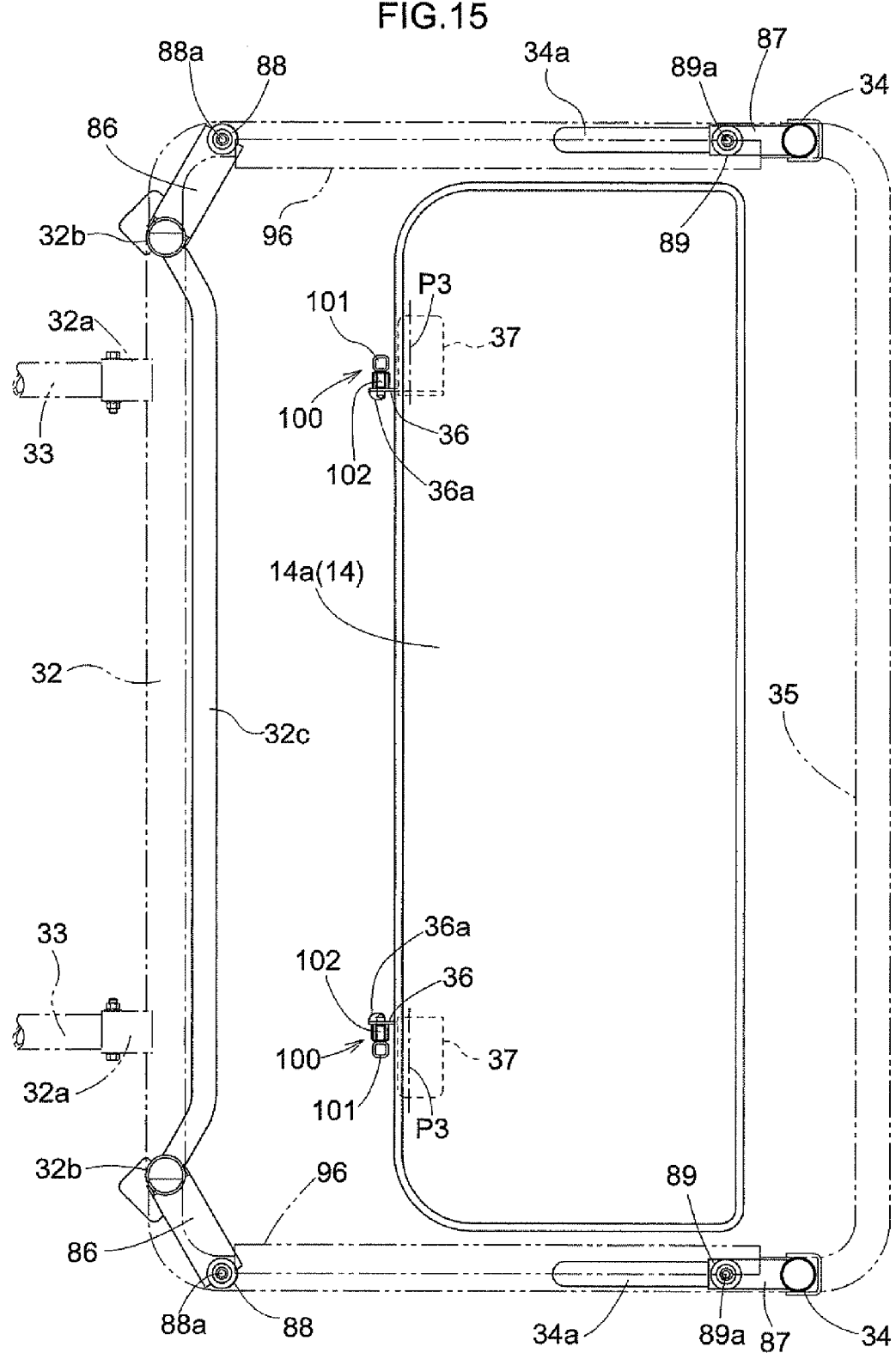
FIG. 15 is a lateral plan view of an area around the partition member.
Figure 16:
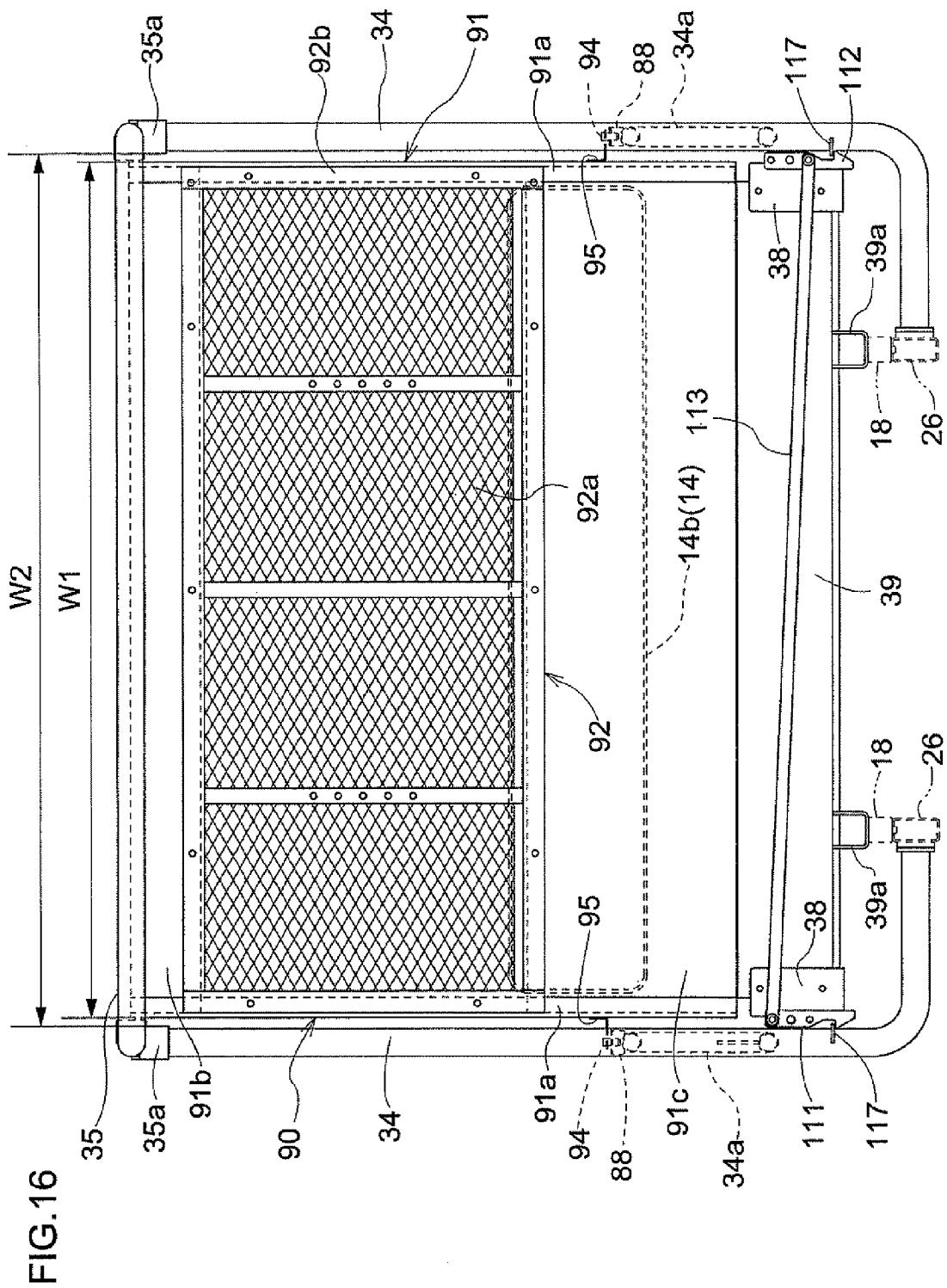
FIG. 16 is a rear view of an area around the partition member.
Figure 19:
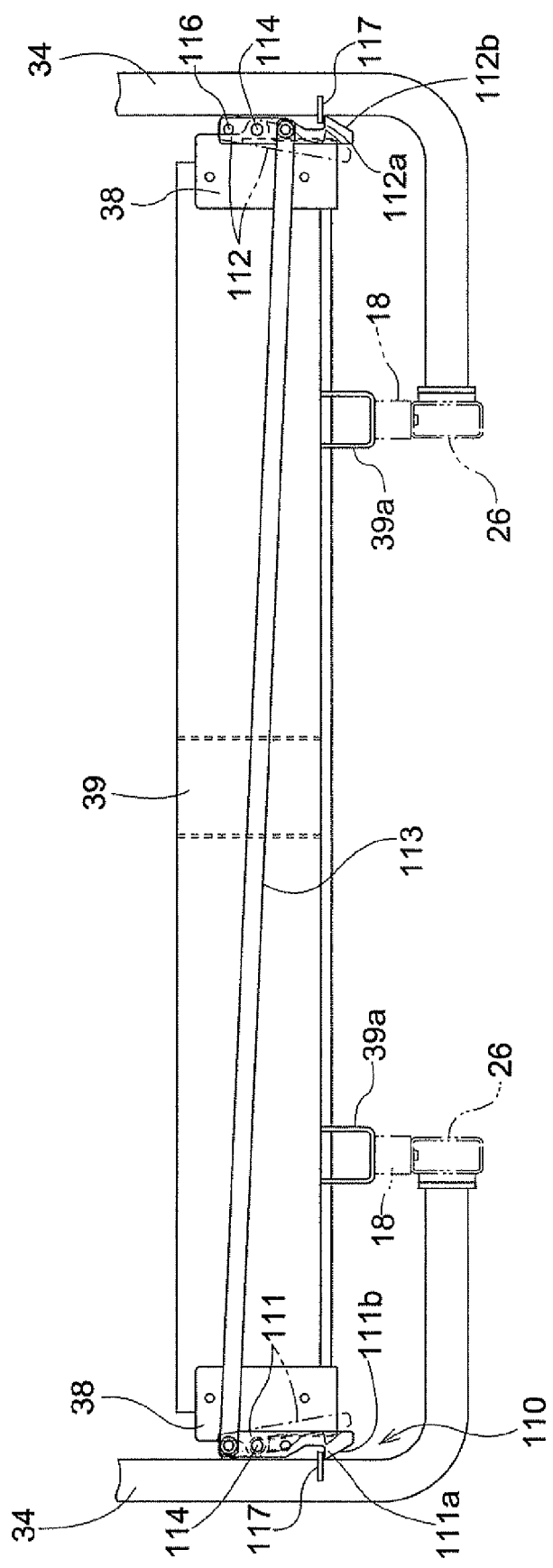
FIG. 19 is a rear view showing the structure of the rear lock mechanism of the rear seat bottom.

The detailed structure of the partition member 90 arranged between the driving section 5 and the rear loading section 6 is described next with reference to FIGS. 14-19. FIG. 14 is a side view of an area around the partition member 90. FIG. 15 is a lateral sectional plan view of an area around the partition member 90. FIG. 16 is a rear view of an area around the partition member 90. FIGS. 17A and 17B are vertical sectional rear views depicting a support structure in an upper portion of the partition member 90. FIG. 17A is the vertical sectional rear view of the partition member 90 fixed to the ROPS 30. FIG. 17B is the vertical sectional rear view of the partition member 90 not fixed to the ROPS 30. FIG. 18 is a side view depicting the structure of the rear lock mechanism 110 of the rear seat bottom 14a. FIG. 19 is a rear view depicting the structure of the rear lock mechanism 110 of the rear seat bottom 14a.

As shown in FIGS. 14-16, the partition member 90, which divides the driving section 5 and the rear loading section 6 (and which forms a back wall of the driving section 5), is provided in the rear of the driving section 5. The position of this partition member 90 can be changed to a rearward position (position shown by solid lines in FIG. 14) where the member 90 is moved rearwardly with the loading floor 40 in the shortened state, and to a forward position (position shown by dashed lines in FIG. 14) where the partition member 90 is moved forwardly with the loading floor 40 in the extended state.

As shown in FIGS. 14 and 15, the right and left front brackets 86 are fixed to the lower portions of the vertical frame portions 32b of the middle support column 32. These right and left front brackets 86 extend laterally outwardly and rearwardly from the lower parts of the vertical frame portions 32b of the middle support column 32. Vertical sections of the right and left front brackets 86 have downwardly opening bracket shapes and the distal ends thereof have vertically oriented holes therein.

Right and left rear brackets 87 are fixedly attached to and extend forwardly from lower portions of the rear support columns 34. Vertical sections of the right and left rear brackets 87 have downwardly opening bracket shapes and the distal ends thereof have vertically oriented holes formed therein. Each of the vertically oriented holes in the front brackets 86 has a front support member 88 fitted therein. A vertically-oriented front hole portion 88a in which lower pivot 94 is inserted is formed in the front support member 88, a lower part of which has a lift prevention member 88b which prevents the lower pivot 94 from moving upwardly.

Each of the vertically oriented holes in the rear brackets 87 has a rear support member 89 fitted therein. A vertically-oriented rear hole portion 89a in which lower pivot 94 is inserted is formed in the rear support member 89, a lower part of which has a lift prevention member 89b which prevents the lower pivot 94 from moving upwardly.

When the lower pivots 94 are inserted in the front or the rear hole portions 88a or 89a and are pushed from above with some force, the lower pivots 94 are inserted into the lift prevention members 88b or 89b. Lifting of the lower pivots 94 is prevented by the frictional holding force of the lift prevention members 88b or 89b, which prevents the lower pivots 94 from slipping out of the front or the rear hole portions 88a or 89a with vertical movements of the partition member 90 caused, for example, by vibration during travel of the work vehicle. The lower pivots 94 can be pulled out of the front or the rear hole portions 88a or 89a by pulling the partition member 90 upwardly with some force against the frictional holding force of the lift prevention members 88b or 89b. The width or the lateral distance between the right and left rear hole portions 89a of the rear support members 89 is set to be the same as the width or the lateral distance between the right and left front hole portions 88a of the right and left front support members 88. The positions of the rear hole portions 89a in the lateral direction are set to be substantially the same as the positions of the front hole portions 88a in the lateral direction.

As shown in FIGS. 14 and 16, the partition member 90 includes a frame member 91, a net member 92, right and left upper pivots 93, and the right and left lower pivots 94. The frame member 91 includes right and left vertical frames 91a, the upper frame 91b extending between and fixed to the upper parts of the right and left vertical frames 91a, and the lower frame 91c extending between and fixed to the lower parts of the right and left vertical frames 91a. Thus, a rectangular opening is formed that is long in the lateral direction in a rear view, and that is surrounded by the right and left vertical frames 91a, the upper frame 91b, and the lower frame 91c.

The width W1 in the lateral direction of the partition member 90 is set to be narrower than the width W2 between the inside surfaces of the right and left rear support column 34, and the width W1 in the lateral direction of the partition member 90 is set to be a dimension so as to form a predetermined gap with the inside surfaces of the right and left rail members 96 described later. This configuration simplifies the support structure of the partition member 90 while covering a large area between the driving section 5 and the rear loading sections 6 by the partition member 90.

The net member 92 is formed by attaching a net 92a with a plurality of air holes made of for example, a wire net, a resin net, or punched metal to a frame-shaped frame 92b formed of band-plate material. The net member 92 is fixed to the frame member 91 by removably fastening the frame-like frame 92b to the frame member 91 from behind. Right and left laterally extending upper pivots 93 are fixed to upper ends of the right and left vertical frames 91a to be concentric with each other. Right and left vertically extending lower pivots 94 are fixed to lower portions of the right and left vertical frames 91a via right and left support brackets 95. The width or the lateral distance between the right and left lower pivots 94 is set to be the same as the width or the lateral distance between the front and the rear hole portions 88a and 89a of the front and the rear support members 88 and 89.

The seat back 14b of the backseat 14 is fastened and fixed to the front side of the lower frame 91c so that the seat back 14b of the backseat 14 is configured to move with the partition member 90.

As shown in FIGS. 14, 17A and 17B, right and left rail members 96 that are long in the fore-and-aft direction are fixed to inside of the right and left fore-and-aft frame portions 35b of an upper rear frame 35. Vertical sections of the right and left rail members 96 as seen from behind have laterally outwardly opening C-shapes and the rail members 96 are fixed to the right and left fore-and-aft frame portions 35b. A guide hole portion or a groove 96A that is long in the fore-and-aft direction is formed in an inward surface of each the right and left rail members 96, and the width of this guide hole portion 96A is set to be somewhat larger than the outside diameter of the upper pivot 93. The front and the rear positioning hole portions 96B and 96C, where the guide hole portions 96A are extended downwardly, are provided in the front and rear end portions of the guide hole portions 96A. The hole width of each of the front and the rear positioning hole portions 96B and 96C is set to accommodate the upper pivot 93 without difficulty and to make the gap with the upper pivot 93 smaller.

The right and left upper pivots 93 of the partition member 90 are fit within the right and left guide hole portions 96A of the right and left rail members 96, and a distal end portion of each upper pivot 93 within the guide hole portion 96 has a washer 97 for preventing the pivot 93 from coming out of the guide hole. This structure allows the upper parts of the partition member 90 to be supported for sliding movement in the fore-and-aft direction along the right and left guide hole portions 96A of the right and left rail members 96.

As shown in FIGS. 14 and 15, the rear seat bottom 14a of the backseat 14 is supported to be pivotable about the laterally extending axis P3 located at a front lower portion of the seat bottom 14a. That is, in this embodiment, the backseat posture change mechanism is a pivot mechanism. This backseat posture change mechanism allows the posture of the rear seat bottom 14a to be changed to an upright posture in which the rear seat bottom 14a is pivoted forwardly its upright position and to a prone posture in which the rear seat bottom 14a is pivoted rearwardly to its prone position.

A bracket 36 is fixed to an upper forward side of each backseat support frame 25. The right and left support brackets 37 fixed to forward lower portions of the rear seat bottom 14a are supported to the brackets 36 to be pivotable about a laterally extending axis P3. A laterally extending hole portion 37a is formed in each support bracket 37. Thus, by moving the seat back 14b forwardly together with the partition member 90 to change the posture of the rear seat bottom 14a to the upright posture, the posture of the backseat 14 is changed to the first posture in which the backseat 14 is in a non-use state where passengers can not sit in the front side of the loading floor 40 in the extended state. Also, by moving the seat back 14b rearwardly together with the partition member 90 to change the posture of the rear seat bottom 14a to the prone posture, the posture of the backseat 14 is changed to the second posture in which the backseat 14 is in a use state where passengers can sit in the front side of the loading floor 40 in the shortened state.

The positioning abutting portion 36a which restricts the forward pivot range of the rear seat bottom 14a is defined in a lower portion of the bracket 36. A front lock mechanism 100 is attached to each forward end portion of the brackets 86. Each front lock mechanism 100 includes an operating portion 101 and a pin 102. When the operating portion 101 of the front lock mechanism 100 is pulled laterally outwardly, the pin 102 that goes into the hole portion 37a of the support bracket 37 is moved laterally outwardly.

By rotating the operating portion 101 in one direction with the operating portion 101 pulled laterally outwardly, the operating portion 101 and the pin 102 can be held in respective laterally outward positions. And, by rotating the operating portion 101 in the opposite direction with the operating portion 101 pulled laterally outwardly, the pin projects inwardly by an urging force of an elastic spring (not shown) within the front lock mechanism 100.

Thus, when the rear seat bottom 14a is pivoted forwardly with the operating portion 101 of the front lock mechanism 100 pulled laterally outwardly, the lower end portion of the support bracket 37 abuts the positioning abutting portion 36a of the bracket 36 so that the rear seat bottom 14a is placed in the position where it is pivoted to its forward most position. At this time, the upright posture of the rear seat bottom 14a in the position where it is in the most forward position can be maintained by rotating the operating portion 101 of the front lock mechanism 100 in said opposite direction, allowing the pin 102 of the front lock mechanism 100 to enter the hole portion 37a of the support bracket 37.

By pulling the operating portion 101 of the front lock mechanism 100 laterally outwardly when the rear seat bottom 14a is held in the upright posture, the pin 102 is disengaged from the hole portion 37a and the rear seat bottom 14a is released from the upright posture. And the posture of the rear seat bottom 14a may be changed by pressing down the rear seat bottom 14a rearwardly to the prone posture. In this case, it is possible to keep the operating portion 101 of the front lock mechanism 100 in its outwardly pulled position in advance for the next posture change operation of the rear seat bottom 14a by rotating the operating portion 101 of the front lock mechanism 100 in said one direction while it is pulled laterally outwardly.

Since the rear seat bottom 14a is held in the upright posture as shown in FIGS. 4 and 14, a predetermined gap can be secured between the rear of the rear seat bottom 14a in the upright posture and the front end portion of the loading floor 40 in the extended state and in the dumping position. Furthermore, the predetermined gap can be secured between an upper front portion of the rear seat bottom 14a in the upright posture, and the partition member 90 in the forward position. Thus, any interference between the rear seat bottom 14a in the upright posture and the loading floor 40 in the extended state can be prevented and any interference between the rear seat bottom 14a in the upright posture and the partition member 90 in the forward position can be prevented.

As shown in FIGS. 18 and 19, right and left support brackets 38, each having an L-shaped vertical cross section in a side view, are fastened to the underside of the rear seat bottom 14a at the right and left side portions of a rear part of the rear seat bottom 14a. The band-plate shaped reinforcement ribs 38a are fixed to the right and left support brackets 38, which allow the rear seat bottom 14a to support the load acting on it through the right and left support bracket 38 without difficulty. A lower vertical plate-like frame 39 spans between and is fixed to the front side of the right and left support brackets 38. Right and left support frames 39a, each having an upwardly opening bracket-shaped cross section in a rear sectional view is fixedly attached to lower parts of the right and left the lower frames 39.

As shown in FIG. 14, when the rear seat bottom 14a is in the prone posture, the right and left support frames 39a are configured to be supported by the rear frames 26 through the seat support members 18 made of resin, or wood fixed to the upper surfaces of the right and left rear frames 26. Thereby, when the posture of the rear seat bottom 14a is changed from the upright posture to the prone posture, the rear of the rear seat bottom 14a are stably supported by the right and left rear frames 26 through the right and left support brackets 38, the lower frames 39, and the right and left support frames 39a.

As shown in FIGS. 18 and 19, a rear portion of the rear seat bottom 14 has a rear lock mechanism 110, which locks the rear seat bottom 14a in the prone posture. The rear lock mechanism 110 includes right and left arm members 111,112, a linkage rod 113, and a plate-shaped member 117.

The left arm member 111 is supported by the left support bracket 38 to be pivotable about a pivot 114 having a fore-and-aft extending axis. An engaging portion 111a extending outwardly to the left and an inclining portion 111b, which is inclined inwardly and downwardly and formed in a lower portion of the engaging portion 111a, are formed in a lower part of the left arm member 111. The right arm member 112 is supported by the right support bracket 38 to be pivotable about a pivot 114 having a fore-and-aft extending axis. An engaging portion 112a extending outwardly to the right and an inclining portion 111b, which is inclined inwardly and downwardly and formed in a lower portion of the engaging portion 112a, are formed in a lower part of the right arm member 112.

A linkage rod 113 is rotatably supported by and between an upper part of the left arm member 111 and a vertically central part of the right arm member 112 thereby, the right and left arm members 111,112 are operatively connected. An operating member (not shown) is provided to a left-hand side portion of the linkage rod 113 or the left arm member 111, and the rear lock mechanism 110 can be released from the left outer side of the backseat 14 by this operating member.

Elastic springs 115 are fit around the pivots 114 of the right and left arm members 111,112. Each elastic spring 115 is arranged between right or left arm member 111,112 and the respective reinforcement rib 38a and the lower parts of the right and left arm members 111,112 are urged laterally outwardly by the elastic springs 115. The stopper pin 116 extending in the fore-and-aft direction is fixed to the upper part of the right arm member 112, and the pivot range of the right and left arm member 111,112 is restricted by the abutment of this stopper pin 116 against the right end edge of an upper portion of the right support bracket 38.

The plate-shaped horizontal plate-like members 117 extend forwardly and inwardly from lower parts of the right and left rear support columns 34 by the lower parts of the right and left rear support columns 34. The height of the right and left plate-shaped members 117 is determined such that the engaging portions 111a and 112a of the right and left arm members 111,112 abut the under sides of the plate-shaped members 117 without any gap when the posture of the rear seat bottom 14a is changed to the prone posture.

With the structure of the rear lock mechanism 110 as described above, when the linkage rod 113 is pulled to the left by actuating the operating member with the rear seat bottom 14a in the prone posture, engaging portions lila and 112a of the right and left arm members 111,112 are released from the plate-shaped members 117, which allows the rear seat bottom 14a to be pivoted forwardly and upwardly (lock release state of the rear lock mechanism 110). In this case, if the operating member is released, the lower parts of the right and left arm member 111,112 are pivoted laterally outwardly by the urging force of the elastic springs 115, and pivoting of the right and left arm members 111,112 are restricted by the stopper pin 116.

On the other hand, when the front lock mechanism 100 is operated to the lock release state and the rear seat bottom 14a is pivoted rearwardly and downwardly with the rear seat bottom 14a in the upright posture, the guide portions 111b and 112b of the right and left arm members 111,112 abut the plate-shaped members 117 to pivot the lower parts of the right and left arm members 111,112 inwardly. And the engaging portions 111a and 112a of the arm members 111,112 move to underneath the plate-shaped members 117 by the urging force of the elastic springs 115 and engage with the plate-shaped members 117, thus preventing the upper part of the rear seat bottom 14a from being pivoted upwardly (lock state of the rear lock mechanism 110). Through use of the front and the rear lock mechanisms 100,110, the posture of the rear seat bottom 14a can be changed simply and easily while allowing the rear seat bottom 14a to be securely fixed in the prone posture and the upright posture with use of the front and the rear lock mechanisms 100,110.

[Positional Change of the Partition Member]

Positional change of the partition member 90 in the fore-and-aft direction of the vehicle between a forward position and a rearward position by the partition member position change mechanism is described next with reference to FIGS. 1, 2, 14, and 17. With the loading floor 40 switched to the shortened state, the posture of the rear seat bottom 14a changed to the prone posture, and the partition member 90 in the rearward position as shown in FIG. 1, the partition member 90 is pushed up slightly as shown in FIG. 14. This causes the lower pivots 94 to move up and out of the rear hole portions 89a of the rear support members 89 attached to the rear brackets 87, which places the lower part of the partition member 90 in condition for movement in the fore-and-aft direction (see FIG. 17B). When this happens, the upper pivots 93 move to the upper guide hole portions 96A from the rear positioning portions 96C of the rail members 96, placing the upper part of the partition member 90 in condition for slide movement in the fore-and-aft direction along the guide hole portions 96A of the rail members 96. That is, the partition member 90 can be positioned for slide movement in the fore-and-aft direction simply by pushing the partition member 90 upwardly.

Next, the partition member 90 is slid forward along the guide hole portions 96A of the rail members until the positions of the lower pivots 94 are aligned with the front hole portions 88a of the front support members 88 attached to the front brackets 86, and the lower pivots 94 are dropped into the front hole portions 88a of the front support members 88, where the partition member 90 is pushed downwardly by a small amount to complete the position change of the partition member 90 to the forward position (see FIG. 17B). When this happens, the upper pivots 93 move to the front positioning portion 96B downwardly from the guide hole portions 96A of the rail members 96 with the downward movement of the partition member 90, where movement of the upper part of the partition member 90 in the fore-and-aft direction is restricted by the front positioning portions 96B. That is, movement of the partition member 90 in the fore-and-aft direction can be restricted and the lower part of the partition member 90 is fixed against the brackets 86 simply by pushing the partition member 90 downwardly.

The mode of the driving section 5 can be changed from the double-row seat mode (the four-or-five-seater mode) shown in FIG. 1 to the single-row mode (two-seater mode) shown in FIG. 2 by changing the position of the partition member 90 to the forward position, changing the posture of the rear seat bottom 14a to the upright posture, and by switching the loading floor 40 to the extended state.

As shown in FIG. 2, with the loading floor 40 switched to the extended state, the posture of the rear seat bottom 14a changed to the upright posture, and the partition member 90 moved to the forward position, the partition member 90 is placed in condition for rearward movement by switching the loading floor 40 to the shortened state, and by changing the posture of the rear seat bottom 14a to the prone posture.

Next, as shown in FIG. 14, when the partition member 90 is pushed upwardly by a small amount, the lower pivots 94 move up and out of the front hole portions 88a of the front support member 88 attached to the front brackets 86, placing the lower part of the partition member 90 in condition for movement in the fore-and-aft direction (see FIG. 17B). When this occurs, the upper pivots 93 move from the front positioning portion 96B upwardly to the guide hole portions 96A of the rail members 96, placing the upper part of the partition member 90 in condition for sliding movement in the fore-and-aft direction along the guide hole portions 96A of the rail members 96. That is, the partition member 90 can be positioned for slide movement in the fore-and-aft direction simply by pushing the partition member 90 upwardly.

Next, the partition member 90 is slid rearward along the guide hole portions 96A of the rail members 96 until the positions of the lower pivots 94 are aligned with the rear hole portions 89a of the rear support members 89 attached to the rear brackets 87, and the lower pivots 94 are dropped into the rear hole portions 89a of the rear support members 89, where the partition member 90 is pushed downwardly by a small amount to complete the position change of the partition member 90 to the rearward position (see FIG. 17A). When this occurs, the upper pivots 93 move to the rear positioning portion 96C downwardly from the guide hole portions 96A of the rail members 96 with the downward movement of the partition member 90, where movement of the upper part of the partition member 90 in the fore-and-aft direction is restricted by the rear positioning portions 96C. That is, movement of the partition member 90 in the fore-and-aft direction can be restricted and the lower part of the partition member 90 is fixed against the rear brackets 87 simply by pushing the partition member 90 downwardly. Thus, the mode of the driving section 5 can be changed from the single-row mode (two-seater mode) shown in FIG. 2 to the double-row seat mode (four-or-five-seater mode) shown in FIG. 1. By adopting the above-described structures for the loading floors 40 and the partition member 90, etc., the user-friendly work vehicle can be obtained and the workability of work operations using the work vehicle can be improved.

And, when the posture of the rear seat bottom 14a is changed to the upright posture with the loading floor 40 changed to the shortened state, the space above such parts as the engine E located underneath the rear seat bottom 14a can be exposed, facilitating the maintenance of the engine E etc. and improving the efficiency of the maintenance work on the work vehicle. In this case, since the upper part of the engine E and the transmission case 8 can be exposed to a greater extent when the loading floor 40 is moved to its dumping position, the maintenance of the engine E and the transmission case 8, etc. can be performed more easily by moving the loading floor 40 to the dumping position.

Second Embodiment

In the first embodiment described above, the loading floor size changeover mechanism was shown and described in which the right and left forward side wall portions 45 were folded rearwardly after raising and folding the front bottom portion 42 with the front wall portion 46 rearwardly to the upright position. Different order for folding the front wall portion 46, the front bottom portion 42, and the right and left forward side wall portions 45 can be adapted. For example, the loading-platform size changeover mechanism may be configured such that the front bottom portion 42 with the front wall portion 46 are raised rearwardly to the upright position folded after folding the right and left forward side wall portions 45 rearwardly.

Figure 20A:
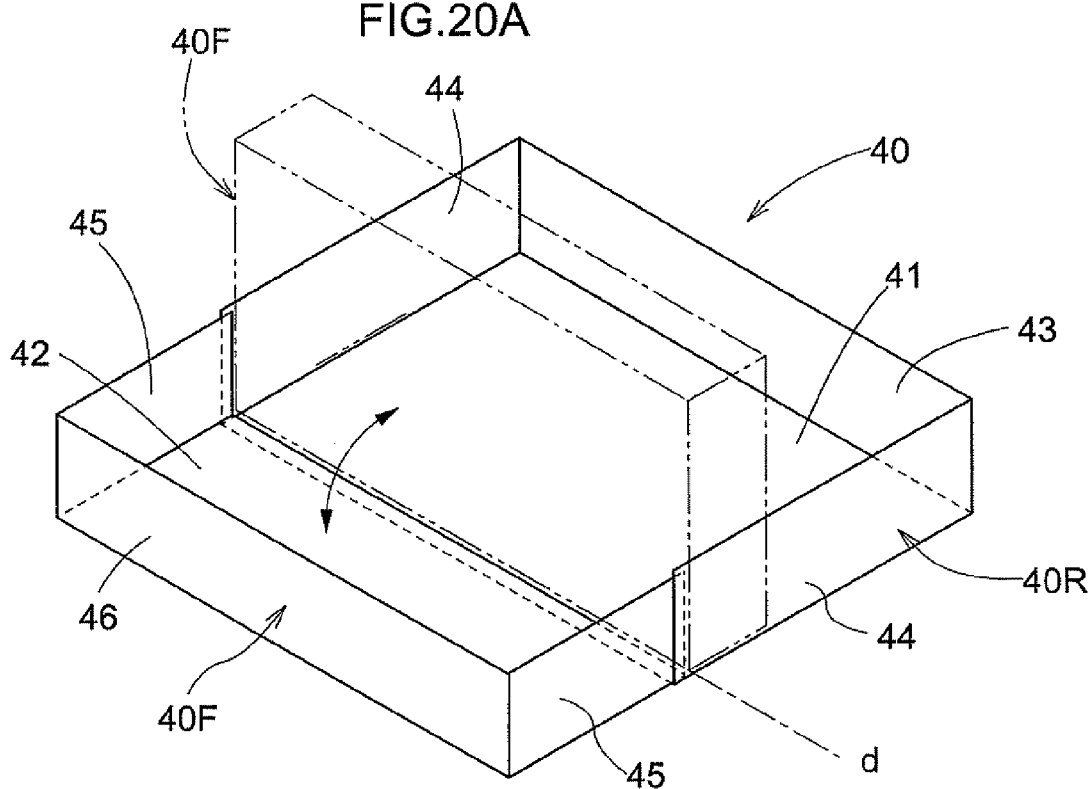
FIG. 20A is a schematic perspective view showing a size change structure of the loading floor in accordance with a different embodiment.
Figure 20B:
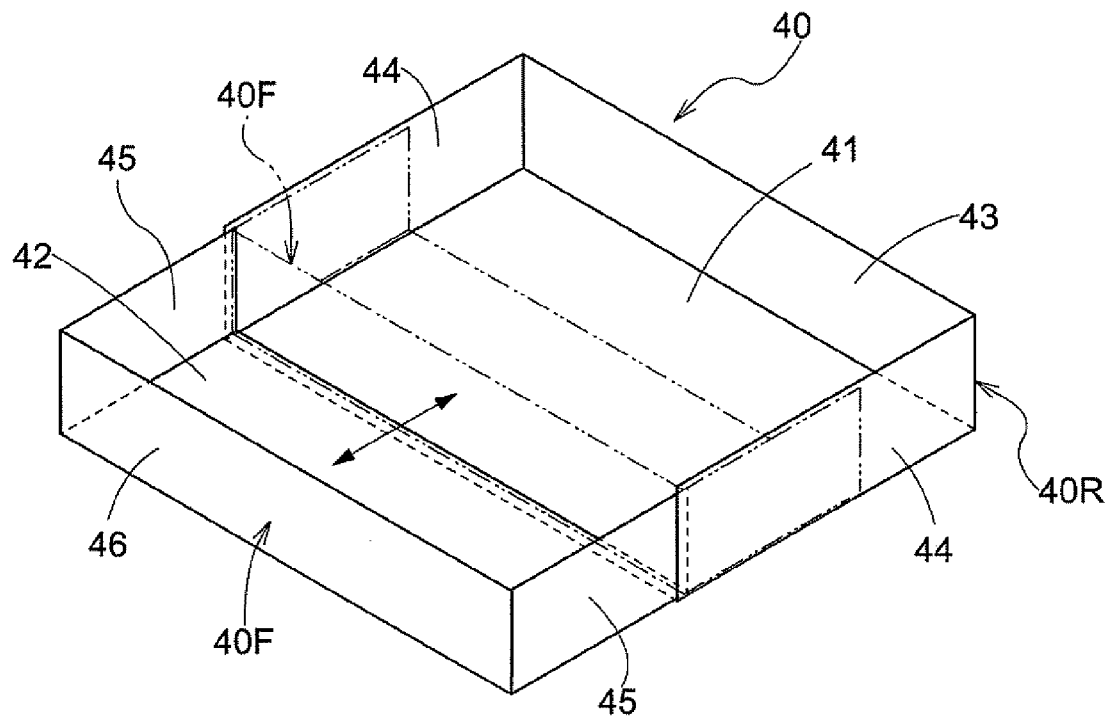
FIG. 20B is a schematic perspective view showing a size change structure of the loading floor in accordance with a different embodiment.

While in the first embodiment described above, the loading-platform size changeover mechanism was shown and described in which the loading floor 40 was switched between the extended state and the shortened state by folding the front wall portion 46, the front bottom portion 42, and the right and left forward side wall portions 45 rearwardly, the loading-platform size changeover mechanism such as one shown in FIG. 20A or 20B may be adapted.

In the loading-platform size changeover mechanism shown in FIG. 20A, the loading floor 40 includes the front loading floor 40F and the rear loading floor 40R while the front bottom portion 42, the right and left forward side wall portions 45, and the front wall portion 46 are all fixed in place. The lower part of the rear end of the front loading floor 40F is supported to the front end of the rear loading floor 40R to be pivotable about a laterally extending axis d. Thus, the entire front loading floor 40F is pivotably supported in one piece by the rear loading floor 40R about the laterally extending axis d. Thus the loading floor 40 can be switched between an extended state in which the total length of the loading floor 40 is extended with the entire front loading floor 40F pivoted forwardly as shown with solid lines in FIG. 20A, and a shortened state in which the total length of the loading floor 40 is shortened with the front loading floor 40F pivoted rearwardly and upwardly in one piece as shown with dashed lines in FIG. 20A. In addition, a locking device (not shown) which fixes the front loading floor 40F with respect to the rear loading-platform 40R in the extended state and the shortened state is provided between the front loading floor 40F and the rear loading floor 40R.

In the loading-platform size changeover mechanism shown in FIG. 20B, the loading floor 40 includes the front loading floor 40F and the rear loading floor 40R while the front bottom portion 42, the right and left forward side wall portions 45, and the front wall portion 46 are all fixed. The front loading floor 40F is supported by the rear loading floor 40R for slide movement in the fore-and-aft direction along the wall surfaces of the rear loading floor 40R through a sliding mechanism (for example, slide rails, slide guides, etc. not shown). Thereby, the front loading floor 40F is supported by and to be slidable with respect to the rear loading floor 40R. The loading floor 40 is configured to be switchable between an extended state in which the total length of the loading floor 40 is extended with the front loading floor 40F slid forward in one piece as shown with solid lines in FIG. 20B, and a shortened state in which the total length of the loading floor 40 is shortened with the front loading floor 40F slid rearwardly in one piece as shown with dashed-lines in FIG. 20B. In addition, a locking device (not shown) which fixes the front loading floor 40F with respect to the rear loading-platform 40R in the extended state and the shortened state is provided between the front loading floor 40F and the rear loading floor 40R.

And, although not illustrated, a loading-platform size changeover mechanism may be adapted in which the loading floor 40 may be of integral one-piece configuration without adopting a folding or sliding structure (so that the total length of the loading floor 40 cannot be extended or contracted), and this one piece integral loading floor 40 is slidably supported to the rear frame 26. And the front wall portion 46 and the front bottom portion 42 of the loading floor 40 can be moved forwardly and rearwardly by sliding the loading floor 40 in one piece with respect to the rear frame 26 in the fore-and-aft direction.

Third Embodiment

A backseat posture change mechanism having a different structure may be adopted in lieu of the backseat posture change mechanism, in the first and second embodiments described above, which change the posture of the backseat 14 to the first and second postures. More specifically, for example, the rear seat bottom 14a in the prone posture is fixed to backseat support frame 25, etc., and the seat back 14b is fixed to the partition member 90. And the backseat posture change mechanism may be configured to change the posture of the backseat 14 to the first posture in which the seat back 14b is moved forward, and to the second posture in which the seat back 14b is moved rearward. In this case, the height of the lower end of the front bottom portion 42 in the extended state is set to be higher than the height of an upper end of the rear seat bottom 14a so that a predetermined gap is formed in the vertical direction between the rear seat bottom 14a and the front bottom portion 42 in the extended state.

Alternatively, for example, the rear seat bottom 14a in the prone posture is fixed to backseat support frame 25, etc., and the seat back 14b is supported to and is pivotable forwardly and rearwardly about a laterally extending axis at a rear of the rear seat bottom 14a. And the backseat posture change mechanism may be configured to change the posture of the backseat 14 to the first posture in which the seat back 14b is lying forward, and to the second posture in which the seat back 14b is upright. In this case, the height of the lower end of the front bottom portion 42 in the extended state is set to be higher than the height of an upper end of the seat back 14b in the forwardly lying position so that a predetermined gap is formed in the vertical direction between the seat back 14b in the forwardly lying position and the front bottom portion 42 in the extended state.

Alternatively, for example, the seat back 14b is supported to and is pivotable forwardly and rearwardly about a laterally extending axis at the rear of the rear seat bottom 14a and the rear seat bottom 14a is supported to and pivotable forwardly and rearwardly about a laterally extending axis at the front of the backseat support frame 25. And the backseat posture change mechanism may be configured to change the posture of the backseat 14 to the first posture in which the seat back 14b is lying forward and the rear seat bottom 14a is upright, and to the second posture in which the rear seat bottom 14a is lying rearwardly and the seat back 14b is upright.

And, for example, the rear seat bottom 14a is supported by backseat support frames 25, etc. for sliding movement in the fore-and-aft direction. The backseat posture change mechanism may be configured to change the posture of the backseat 14 to the first posture in which the backseat 14 is slid forwardly, and to the second posture in which the backseat 14 is slid rearwardly. In this case, the seat back 14b may be configured to slide with the rear seat bottom 14a, or the seat back 14b may be configured to move independently from the rear seat bottom 14a. When the configuration in which the seat back 14b slides with the rear seat bottom 14a is adopted, the seat back 14b is fixed to a rear portion of the rear seat bottom 14a for sliding together. In addition, the seat back 14b may be supported to and is pivotable forwardly and rearwardly about a laterally extending axis at the rear of the rear seat bottom 14a and the seat back 14b may lie forward and also may be slidable.

Although a loading floor 40 including a flap member (the rear wall portion 43, the rear side wall portions 44, the forward side wall portions 45, the front wall portion 46) was used as an example in the first, second, and the third embodiments described above, the present invention can be applied equally to a loading floor in which the heights of the flap members differ (not shown), or to a loading floor with a flat deck without flap members (not shown). Also the present invention can be applied similarly to a loading floor of a van type having a ceiling member (not shown).

What is claimed is:

1. A pickup-style work vehicle comprising:
a front driver's seat;
a backseat;
a loading floor located rearwardly of the backseat, the loading floor capable of being moved to a dumping position;
a loading floor size changeover mechanism that changes a size of the loading floor between a first state in which a front wall portion and a front bottom portion of the loading floor are moved forwardly in a fore-and-aft direction of a vehicle and a second state in which the front wall portion and the front bottom portion of the loading floor are moved rearwardly in the fore-and-aft direction;
a backseat posture change mechanism that changes a posture of the backseat between a first posture which is a non-use state and a second posture which is a use state, a fore-and-aft dimension of the backseat in the first posture being less than the fore-and-aft dimension of the backseat in the second posture;
wherein the backseat in the first posture is located immediately forwardly of the loading floor in the first state and the backseat in the second posture is located immediately forwardly of the loading floor in the second state.

2. The pickup-style work vehicle in accordance with claim 1, wherein
the loading floor size changeover mechanism is a folding mechanism that allows the front wall portion and the front floor portion to be folded in the fore-and-aft direction of the vehicle.

3. The pickup-style work vehicle in accordance with claim 1, wherein
the backseat posture change mechanism is a pivoting mechanism that allows the backseat to be pivoted about an axis laterally extending with respect to the vehicle wherein a seat bottom surface, to be sat on, of the backseat extends vertically when the backseat is in the first posture and the seat bottom surface of the backseat extends horizontally when the backseat is in the second posture.

4. The pickup-style work vehicle in accordance with claim 1, wherein
the backseat is supported by one or more back seat support frames and the loading floor is supported by one or more rear frames connected with the one or more backseat support frames.

\* \* \* \* \*